United States Patent
Hollenbeck et al.

(10) Patent No.: US 6,271,609 B1
(45) Date of Patent: Aug. 7, 2001

(54) PROGRAMMABLE ELECTRIC MOTOR AND METHOD OF ASSEMBLY

(75) Inventors: Robert K. Hollenbeck; James E. Grimm; Gregory A. Thompson, all of Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/275,989

(22) Filed: Mar. 25, 1999

(51) Int. Cl.$^7$ .............................. H02K 11/00; H02K 5/00; H02K 7/00

(52) U.S. Cl. ............................ 310/71; 370/89; 370/67 R; 370/68 R

(58) Field of Search .................................. 310/71, 89, 66, 310/67 R, 68 R, DIG. 6, 62, 63, 42; 336/192; 363/145; 29/596

(56) References Cited

U.S. PATENT DOCUMENTS

| | | | |
|---|---|---|---|
| 2,427,947 | 9/1947 | Koch | 308/166 |
| 2,500,592 | 3/1950 | Whiteley | 308/72 |
| 2,571,672 | 10/1951 | Bradley | 308/132 |
| 2,709,228 | 5/1955 | Miller et al. | 310/40 |
| 2,839,697 | 6/1958 | Pierce et al. | 310/93 |
| 2,857,534 | 10/1958 | Beach | 310/74 |
| 3,127,092 | 3/1964 | Shenberger | 230/117 |
| 3,305,740 | 2/1967 | Shano | 310/42 |
| 3,336,092 | 8/1967 | Dochterman | 308/132 |
| 3,427,485 | 2/1969 | Dotto | 310/164 |
| 3,441,763 | 4/1969 | Patrignani | 310/179 |
| 3,448,306 | 6/1969 | Murray | 310/83 |
| 3,459,982 | 8/1969 | Cartier | 310/164 |
| 3,493,800 | 2/1970 | Barrett | 310/168 |
| 3,496,393 | 2/1970 | Reifman et al. | 310/49 |
| 3,501,661 | 3/1970 | Heinzen et al. | 310/194 |
| 3,508,091 | 4/1970 | Kavanaugh | 310/49 |
| 3,541,363 | 11/1970 | Vettermann et al. | 310/49 |
| 3,549,925 | 12/1970 | Johnson | 310/168 |

(List continued on next page.)

FOREIGN PATENT DOCUMENTS

| | | |
|---|---|---|
| 213 797 | 6/1941 | (CH) . |
| 0 299 512 | 7/1988 | (EP) . |
| 0 591 724 | 9/1993 | (EP) . |
| 0 577 201 A1 | 1/1994 | (EP) . |
| 2 570 228 | 9/1984 | (FR) . |
| 10014154 | 1/1998 | (JP) . |
| 11027898 | 1/1999 | (JP) . |

OTHER PUBLICATIONS

International Search Report, PCT Patent Application Serial No. PCT/US00/08040, Sep. 20, 2000, 4 pages.

"AMP Product Guide", AMP Incorporated, Harrisburg, PA; 1991; pp. 3268–3269.

"Surface Mount & Through Hole Interconnection & Assembly Solutions", Zierick Manufacturing Corporation, Mount Kisco, NY; published before Oct. 21, 1997; pp. 38.

M. Weh et al., "New Permanent Magnet Excited Synchronous Machine with High Efficiency at Low Speeds", Institut fur elektrische Maschinen; published before Oct. 21, 1997.

GE SME44 Motor Assembly, admitted prior art, see description and drawings attached.

*Primary Examiner*—Nestor Ramirez
*Assistant Examiner*—Dang Dinh Le
(74) *Attorney, Agent, or Firm*—Damian G. Wasserbauer

(57) ABSTRACT

An electric motor having a snap-together construction without the use of separate fasterners. The construction of the motor removes additive tolerances for a more accurate assembly. The motor is capable of programming and testing after final assembly and can be non-destructively disassembled for repair or modification. The motor is constructed to inhibit the ready entry of water into the motor housing and to limit the effect of any water which manages to enter the housing.

16 Claims, 22 Drawing Sheets

U.S. PATENT DOCUMENTS

| | | | |
|---|---|---|---|
| 3,551,711 | 12/1970 | Davis | 310/43 |
| 3,553,510 | 1/1971 | Howey | 310/156 |
| 3,558,940 * | 1/1971 | Chestnut et al. | 310/41 |
| 3,603,825 | 9/1971 | Sheridan et al. | 310/194 |
| 3,675,060 | 7/1972 | Hills | 310/172 |
| 3,783,313 | 1/1974 | Mathur | 310/49 |
| 3,790,834 | 2/1974 | Tanaka | 310/162 |
| 3,826,939 | 7/1974 | Mori et al. | 310/154 |
| 3,881,243 | 5/1975 | Bannon | 29/598 |
| 3,997,806 | 12/1976 | Noto et al. | 310/268 |
| 4,032,807 | 6/1977 | Richter | 310/178 |
| 4,059,780 | 11/1977 | Mazuir | 310/164 |
| 4,074,157 | 2/1978 | Lace | 310/67 R |
| 4,105,907 | 8/1978 | Hagenlocher et al. | 310/232 |
| 4,114,056 | 9/1978 | Nimura | 310/42 |
| 4,204,810 | 5/1980 | Vogel | 417/244 |
| 4,217,508 | 8/1980 | Uzuka | 310/46 |
| 4,255,681 | 3/1981 | Gerber | 310/162 |
| 4,259,603 | 3/1981 | Uchiyama et al. | 310/68 B |
| 4,260,925 | 4/1981 | Barrett | 310/216 |
| 4,286,186 | 8/1981 | Hagenlocher et al. | 310/89 |
| 4,329,606 | 5/1982 | Montagu | 310/71 |
| 4,355,249 | 10/1982 | Kenwell | 310/49 R |
| 4,376,333 | 3/1983 | Kanamaru et al. | 29/432 |
| 4,381,465 | 4/1983 | Renkl et al. | 310/49 R |
| 4,385,249 | 5/1983 | Fukushima | 310/68 R |
| 4,433,260 | 2/1984 | Weisbord et al. | 310/156 |
| 4,446,392 | 5/1984 | Jaeschke | 310/105 |
| 4,476,449 | 10/1984 | Gray et al. | 335/138 |
| 4,501,984 | 2/1985 | Mishima | 310/261 |
| 4,543,208 | 9/1985 | Horie et al. | 252/62.54 |
| 4,554,491 | 11/1985 | Plunkett | 318/254 |
| 4,588,915 | 5/1986 | Gold et al. | 310/194 |
| 4,598,220 | 7/1986 | Stone | 310/90 |
| 4,601,765 | 7/1986 | Soileau et al. | 148/101 |
| 4,604,538 | 8/1986 | Merrill et al. | 310/68 D |
| 4,623,809 | 11/1986 | Westley | 310/49 R |
| 4,656,381 | 4/1987 | Komatsu | 310/257 |
| 4,659,952 | 4/1987 | Unjo et al. | 310/90 |
| 4,682,065 | 7/1987 | English et al. | |
| 4,689,023 * | 8/1987 | Strong et al. | 439/189 |
| 4,693,580 | 9/1987 | Hanamori et al. | 354/271.1 |
| 4,695,419 | 9/1987 | Inariba | 264/259 |
| 4,713,567 | 12/1987 | Fey et al. | 310/105 |
| 4,724,347 | 2/1988 | Reinhardt et al. | 310/68 R |
| 4,728,833 | 3/1988 | Shiraki et al. | 310/68 R |
| 4,733,114 | 3/1988 | Suyama et al. | 310/49 R |
| 4,761,576 | 8/1988 | Savage | 310/51 |
| 4,779,031 * | 10/1988 | Arends et al. | 318/565 |
| 4,780,631 * | 10/1988 | Groninger | 310/71 |
| 4,783,608 | 11/1988 | Gruber et al. | 310/90 |
| 4,794,292 | 12/1988 | Torisawa | 310/257 |
| 4,815,949 * | 3/1989 | Rabson | 417/417 |
| 4,823,034 | 4/1989 | Wrobel | 310/67 R |
| 4,841,190 | 6/1989 | Matsushita et al. | 310/257 |
| 4,850,812 * | 7/1989 | Voight | 417/271 |
| 4,864,176 | 9/1989 | Miller et al. | 310/194 |
| 4,866,317 | 9/1989 | Katayama | 310/89 |
| 4,891,567 | 1/1990 | Fujitani et al. | 318/254 |
| 4,895,495 | 1/1990 | Arai | 417/360 |
| 4,899,075 | 2/1990 | Hasebe | 310/257 |
| 4,924,124 | 5/1990 | Kato | 310/43 |
| 4,926,540 | 5/1990 | Kato | 29/596 |
| 4,934,041 | 6/1990 | Hoover et al. | 29/596 |
| 4,947,068 * | 8/1990 | Howard et al. | 310/71 |
| 4,952,828 | 8/1990 | Yu-fang et al. | 310/68 D |
| 4,961,016 | 10/1990 | Peng et al. | 310/62 |
| 4,972,109 | 11/1990 | Kakizaki et al. | 310/49 A |
| 4,972,470 * | 11/1990 | Farago | 380/3 |
| 4,987,331 | 1/1991 | Horng | 310/254 |
| 4,990,806 | 2/1991 | Kikuchi et al. | 310/49 A |
| 5,001,379 | 3/1991 | Katayama | 310/194 |
| 5,004,577 | 4/1991 | Ward | 264/112 |
| 5,016,340 | 5/1991 | Kato | 29/598 |
| 5,047,677 | 9/1991 | Mineta et al. | 310/67 R |
| 5,081,383 | 1/1992 | Kusumoto et al. | 310/59 |
| 5,089,730 | 2/1992 | O'Connor et al. | 310/51 |
| 5,093,599 | 3/1992 | Horng | 310/254 |
| 5,095,612 | 3/1992 | McAvena | 29/596 |
| 5,097,169 | 3/1992 | Fukushima | 310/263 |
| 5,107,159 | 4/1992 | Kordik | 310/156 |
| 5,121,017 | 6/1992 | Yamamoto et al. | 310/49 R |
| 5,121,021 | 6/1992 | Ward | 310/154 |
| 5,132,603 | 7/1992 | Yoshimoto | 318/696 |
| 5,147,601 | 9/1992 | Ohtsuka et al. | 419/25 |
| 5,170,082 | 12/1992 | Nakagawa et al. | 310/45 |
| 5,177,391 | 1/1993 | Kusase | 310/263 |
| 5,237,230 | 8/1993 | Sugiyama et al. | 310/113 |
| 5,245,236 | 9/1993 | Horng | 310/67 R |
| 5,254,892 | 10/1993 | Bosman et al. | 310/49 R |
| 5,268,606 | 12/1993 | Adam et al. | 310/88 |
| 5,270,604 | 12/1993 | Sandel et al. | 310/263 |
| 5,277,500 | 1/1994 | Keck | 384/204 |
| 5,283,495 | 2/1994 | Wendel et al. | 310/257 |
| 5,291,084 | 3/1994 | Shiotsuki et al. | 310/49 R |
| 5,298,820 | 3/1994 | Lee et al. | 310/40 MM |
| 5,313,125 | 5/1994 | Bosman et al. | 310/49 R |
| 5,315,194 | 5/1994 | Brusasco et al. | 310/68 |
| 5,325,003 | 6/1994 | Saval et al. | 310/43 |
| 5,327,037 | 7/1994 | Rasmussen | 310/232 |
| 5,329,199 | 7/1994 | Yockey et al. | 310/263 |
| 5,331,237 | 7/1994 | Ichimura | 310/44 |
| 5,343,104 | 8/1994 | Takahashi et al. | 310/90 |
| 5,361,011 | 11/1994 | York | 310/194 |
| 5,369,324 | 11/1994 | Saether | 310/49 R |
| 5,378,952 * | 1/1995 | Schaffersmann | 310/68 R |
| 5,382,862 | 1/1995 | Ward et al. | 310/263 |
| 5,391,953 * | 2/1995 | Van De Veen | 310/80 |
| 5,492,458 | 2/1996 | Horng | 417/423.7 |
| 5,519,933 | 5/1996 | Sakashita et al. | 29/598 |
| 5,539,263 | 7/1996 | Lee | 310/67 R |
| 5,574,321 | 11/1996 | Baker | 310/67 R |
| 5,583,404 | 12/1996 | Karwath et al. | 318/254 |
| 5,598,071 | 1/1997 | Dunfield et al. | 318/254 |
| 5,610,462 * | 3/1997 | Takahashi | 310/90 |
| 5,616,975 | 4/1997 | May et al. | 310/89 |
| 5,629,574 * | 5/1997 | Cognetti et al. | 310/71 |
| 5,663,604 | 9/1997 | Takahashi | 310/91 |
| 5,744,893 | 4/1998 | Zhao et al. | 310/259 |
| 5,770,902 * | 6/1998 | Batten et al. | 310/71 |
| 5,789,929 * | 8/1998 | Heesemann | 310/52 |
| 5,838,127 | 11/1998 | Young et al. | 318/293 |
| 5,872,410 * | 2/1999 | Sudoff | 310/68 R |
| 5,945,765 | 8/1999 | Chen | 310/257 |
| 5,952,760 * | 9/1999 | Miyazawa et al. | 310/194 |
| 6,118,198 * | 9/2000 | Hollenbeck et al. | 310/89 |

* cited by examiner

FIG_2

FIG_5
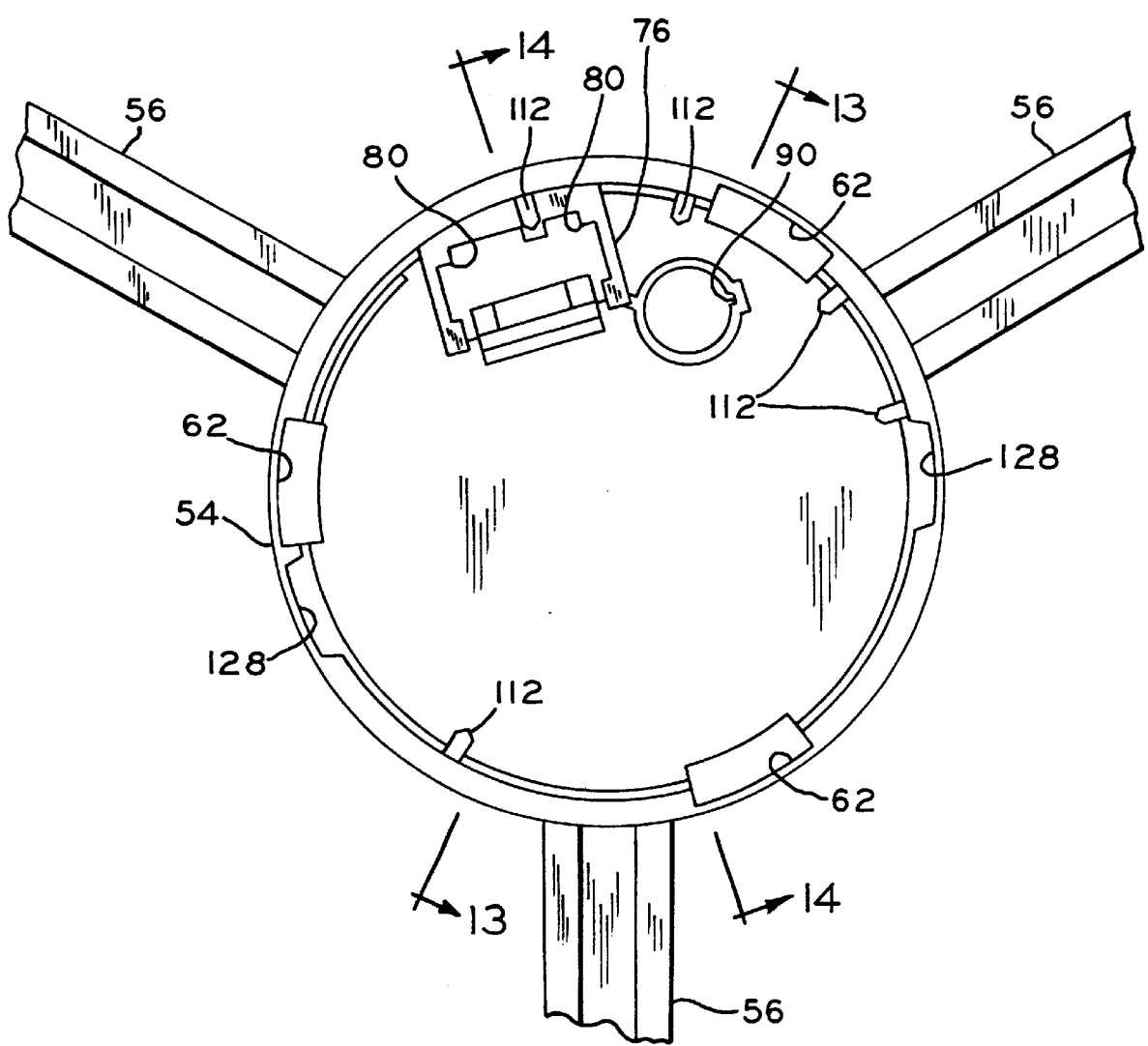

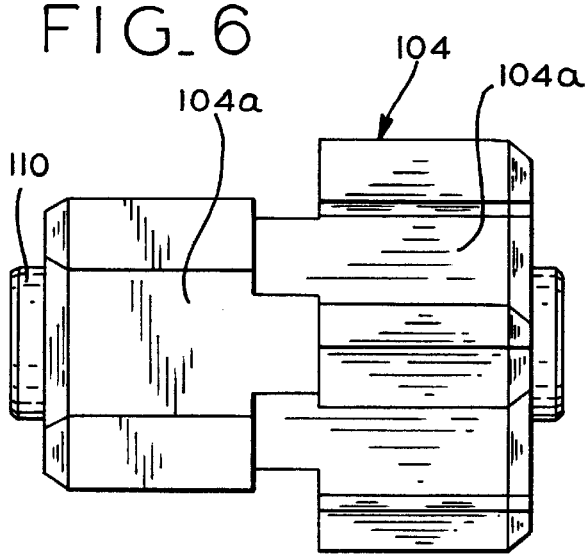
FIG_6
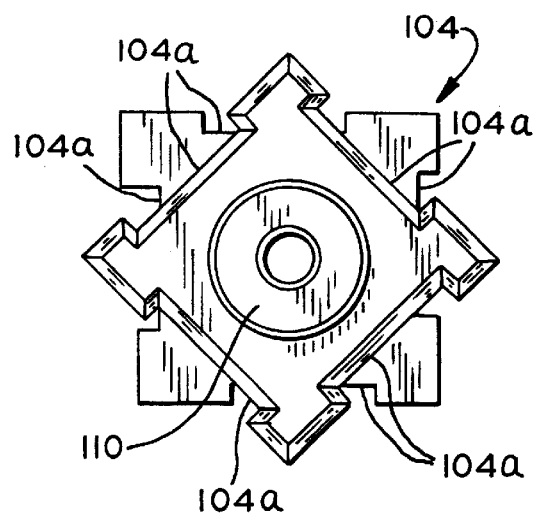
FIG_7
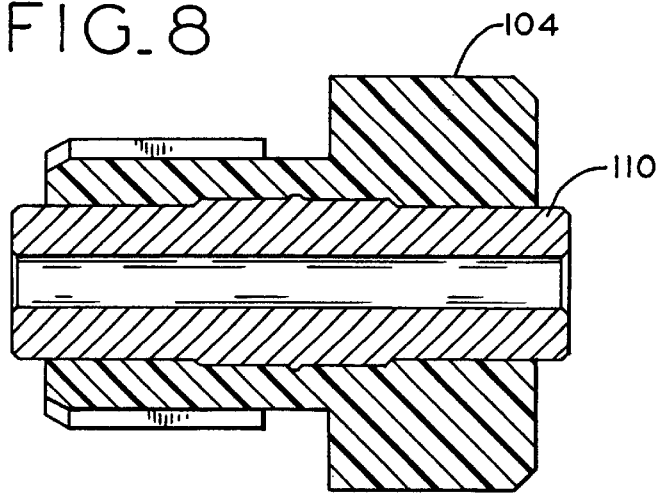
FIG_8

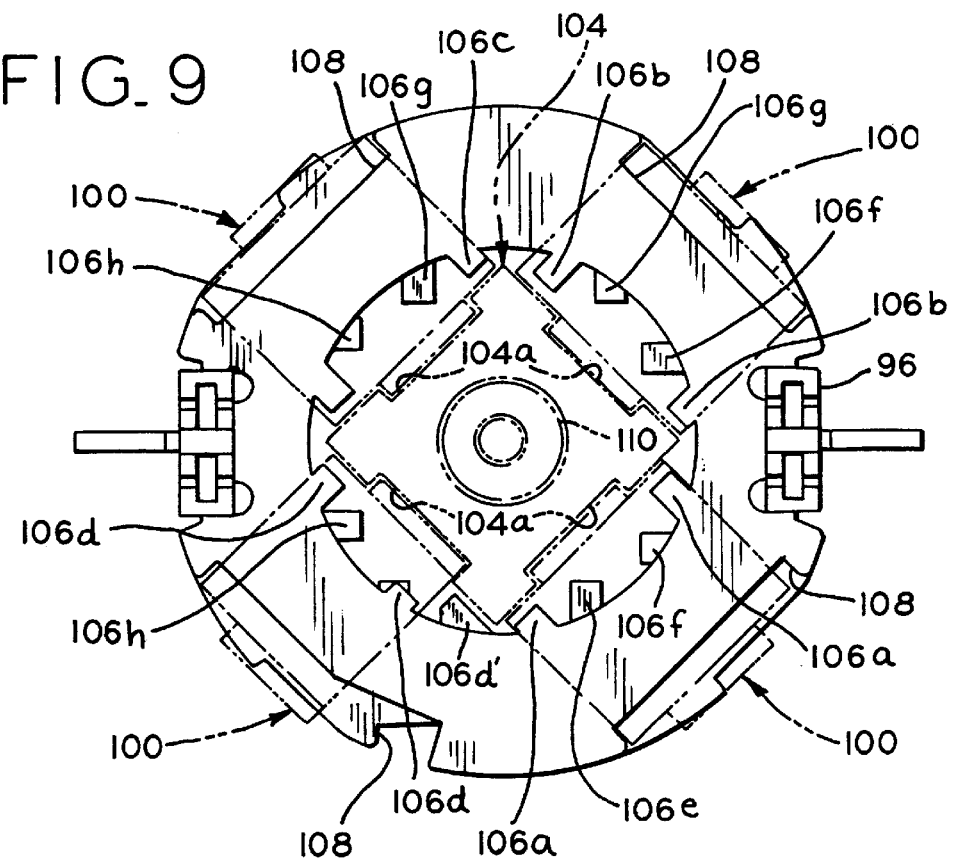
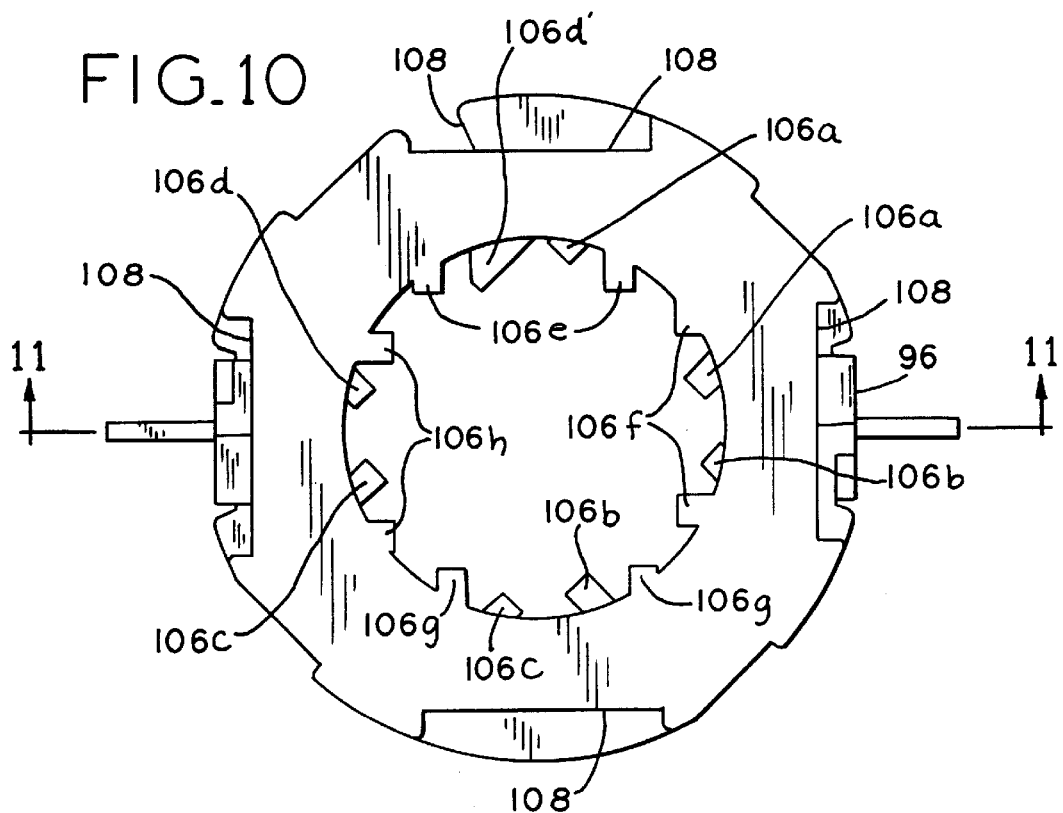

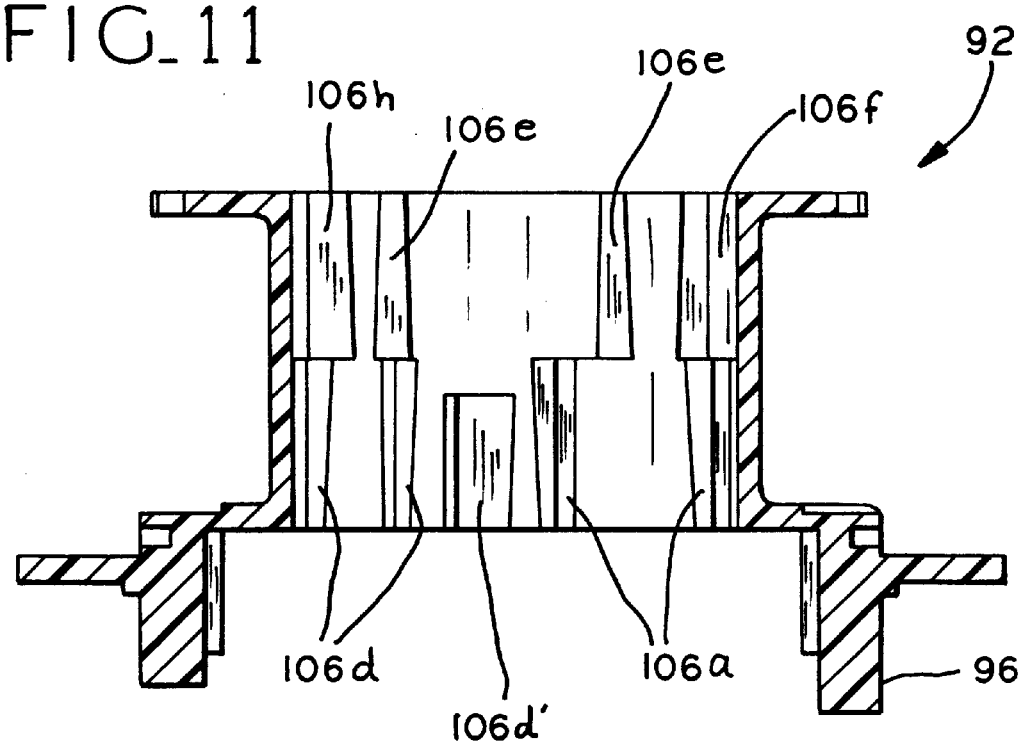
FIG_11
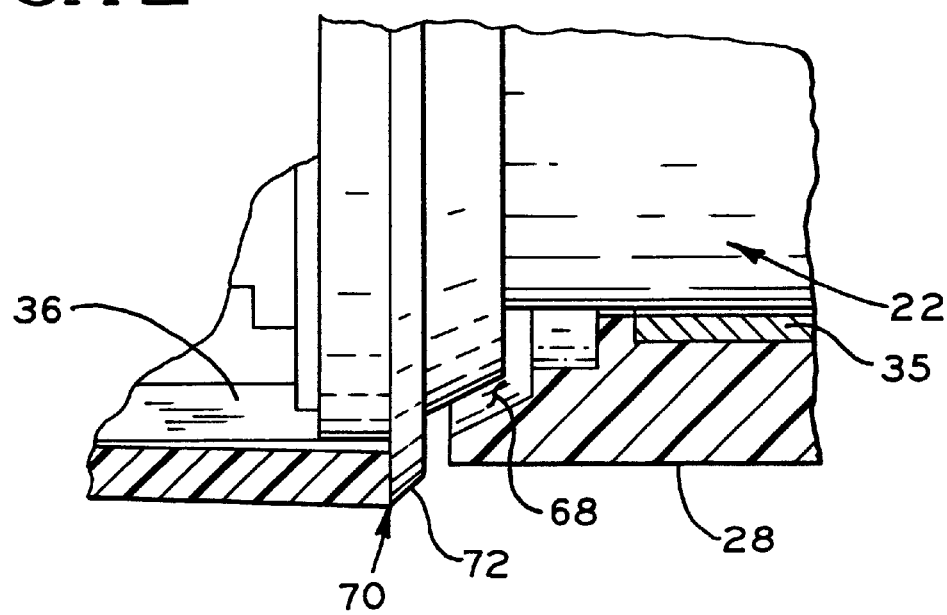
FIG_12

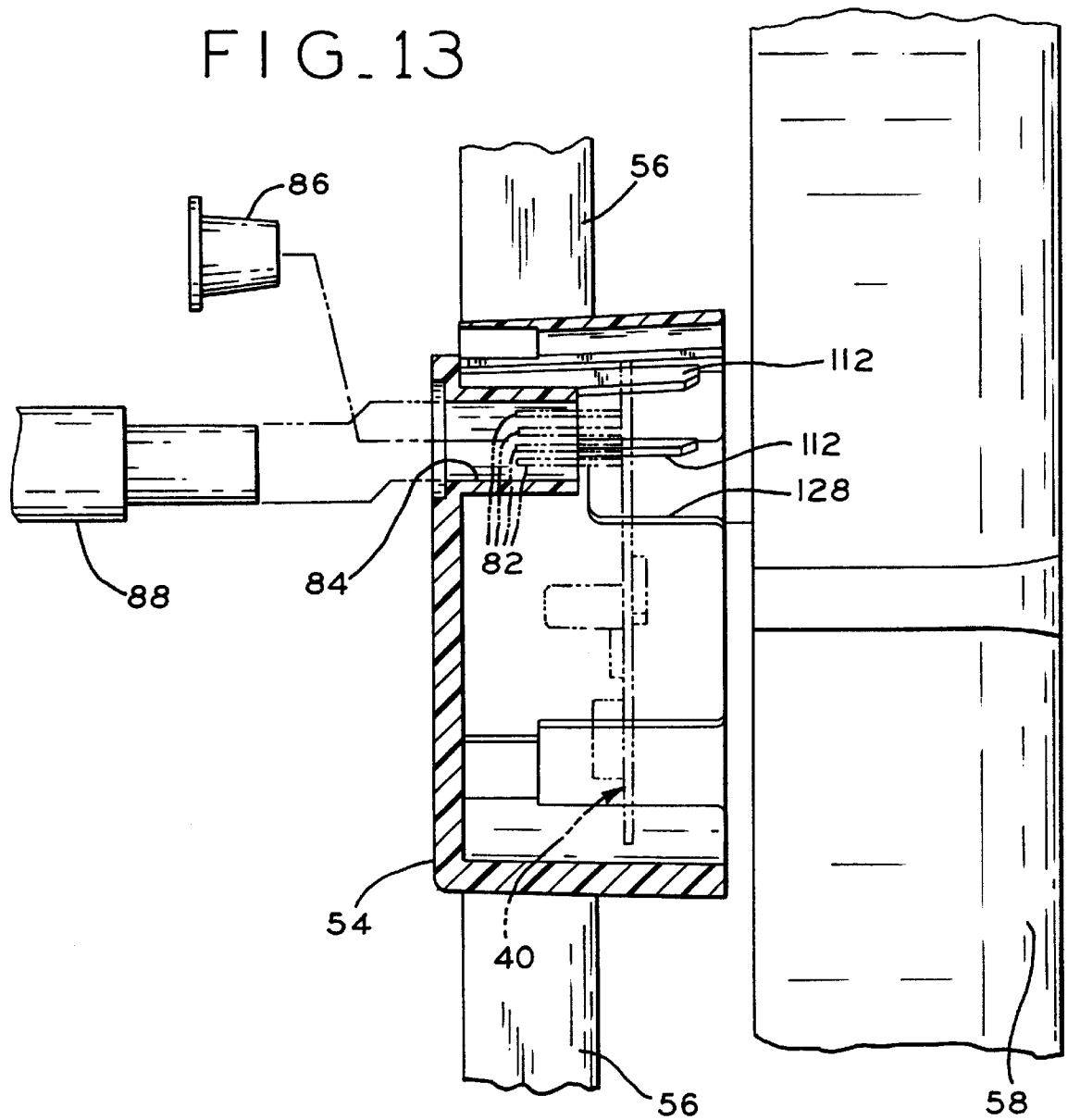

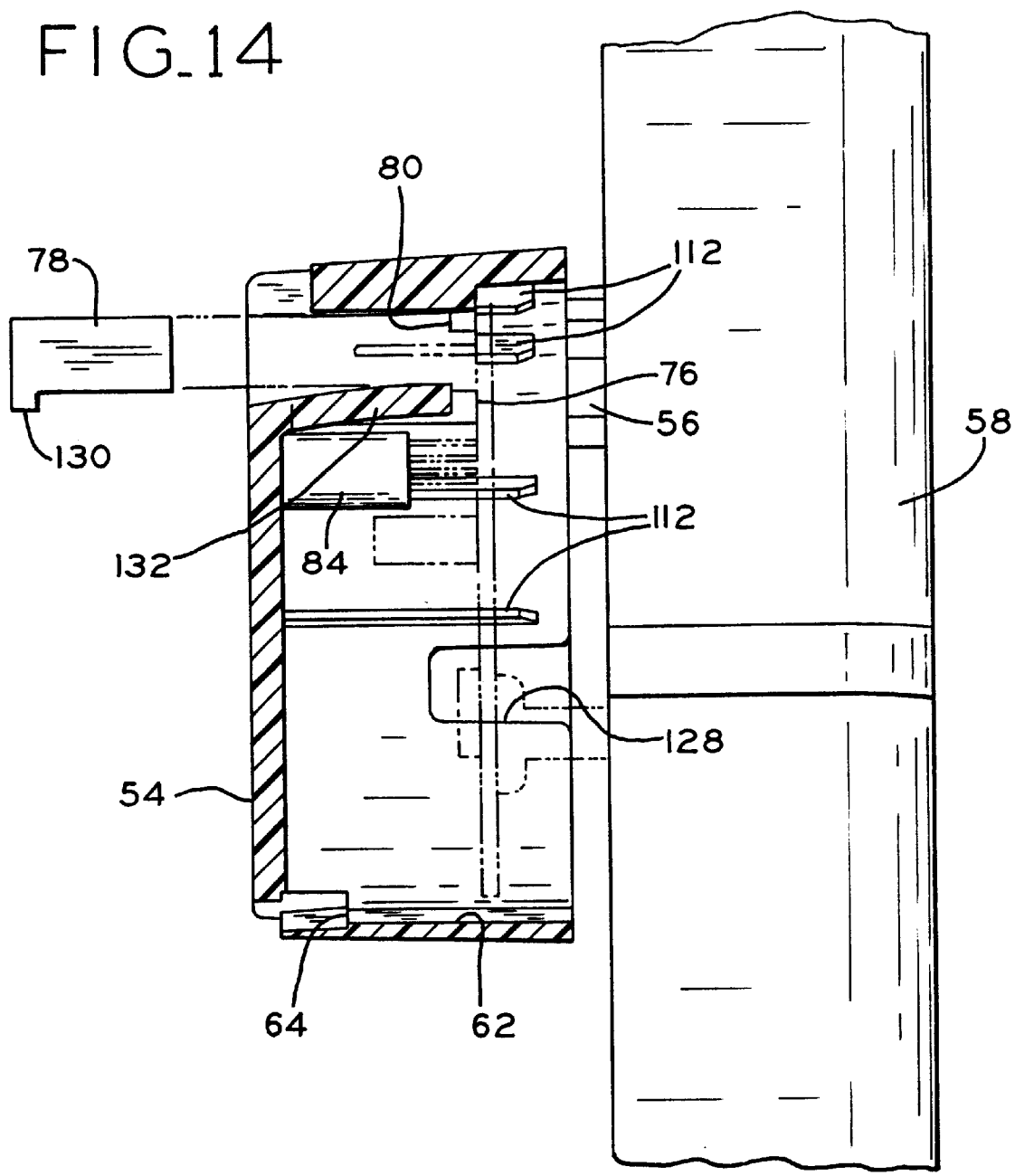
FIG_14

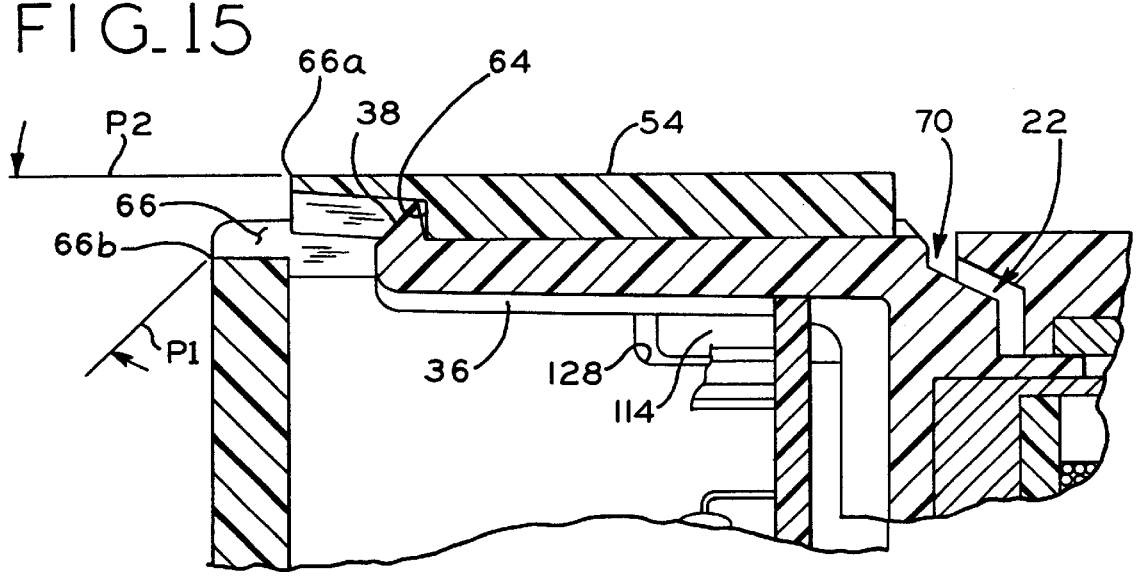
FIG_15

*TINPS IS COMMUTATION PERIOD, 8μs PER BIT

PROGRAMMABLE ELECTRIC MOTOR AND METHOD OF ASSEMBLY

BACKGROUND OF THE INVENTION

This invention relates generally to electric motors and more particularly to an electric motor having a simplified, easily assembled construction.

Assembly of electric motors requires that a rotor be mounted for rotation relative to a stator so that magnets on the rotor are generally aligned with one or more windings on the stator. Conventionally, this is done by mounting a shaft of the rotor on a frame which is attached to the stator. The shaft is received through the stator so that it rotates about the axis of the stator. The frame or a separate shell may be provided to enclose the stator and rotor. In addition to these basic motor components, control components are also assembled. An electrically commutated motor may have a printed circuit board mounting various components. Assembly of the motor requires electrical connection of the circuit board components to the winding and also providing for electrical connection to an exterior power source. The circuit board itself is secured in place, typically by an attachment to the stator with fasteners, or by welding, soldering or bonding. Many of these steps are carried out manually and have significant associated material labor costs. The fasteners, and any other materials used solely for connection, are all additional parts having their own associated costs and time needed for assembly.

Tolerances of the component parts of the electric motor must be controlled so that in all of the assembled motors, the rotor is free to rotate relative to the stator without contacting the stator. A small air gap between the stator and the magnets on the rotor is preferred for promoting the transfer of magnetic flux between the rotor and stator, while permitting the rotor to rotate. The tolerances in the dimensions of several components may have an effect on the size of the air gap. The tolerances of these components are additive so that the size of the air gap may have to be larger than desirable to assure that the rotor will remain free to rotate in all of the motors assembled. The number of components which affect the size of the air gap can vary, depending upon the configuration of the motor.

Motors are commonly programmed to operate in certain ways desired by the end user of the motor. For instance certain operational parameters may be programmed into the printed circuit board components, such as speed of the motor, delay prior to start of the motor, and other parameters. Mass produced motors are most commonly programmed in the same way prior to final assembly and are not capable of re-programming following assembly. However, the end users of the motor sometimes have different requirements for operation of the motor. In addition, the end user may change the desired operational parameters of the motor. For this reason, large inventories of motors, or at least programmable circuit boards, are kept to satisfy the myriad of applications.

Electric motors have myriad applications, including those which require the motor to work in the presence of water. Water is detrimental to the operation and life of the motor, and it is vital to keep the stator and control circuitry free of accumulations of water. It is well known to make the stator and other components water proof. However, for mass produced motors it is imperative that the cost of preventing water from entering and accumulating in the motor be kept to a minimum. An additional concern when the motor is used in the area of refrigeration is the formation of ice on the motor. Not uncommonly the motor will be disconnected from its power source, or damaged by the formation of ice on electrical connectors plugged into the circuit board. Ice which forms between the printed circuit board at the plug-in connector can push the connector away from the printed circuit board, causing disconnection, or breakage of the board or the connector.

SUMMARY OF THE INVENTION

Among the several objects and features of the present invention may be noted the provision of an electric motor which has few component parts; the provision of such a motor which does not have fasteners to secure its component parts; the provision of such a motor which can be accurately assembled in mass production; the provision of such a motor having components capable of taking up tolerances to minimize the effect of additive tolerances; the provision of such a motor which can be re-programmed following final assembly; the provision of such a motor which inhibits the intrusion of water into the motor; and the provision of such a motor which resists damage and malfunction in lower temperature operations.

Further among the several objects and features of the present invention may be noted the provision of a method of assembling an electric motor which requires few steps and minimal labor; the provision of such a method which minimizes the number of connections which must be made; the provision of such a method which minimizes the effect of additive tolerances; the provision of such a method which permits programming and testing following final assembly; and the provision of such a method which is easy to use.

In one form, the invention comprises an electric motor. A stator includes a stator core having a winding thereon. A rotor includes a shaft received in the stator core for rotation of the rotor relative to the stator about the longitudinal axis of the shaft. A housing connected together with the stator and rotor forms an assembled motor, the housing being adapted to support the stator and rotor. A printed circuit board having programmable components thereon controls operation of the motor, the printed circuit board having contacts mounted thereon for use in programming the programmable components, the printed circuit board being received in the housing. The housing has a port therein generally in registration with the contacts on the printed circuit board, the port being sized and shaped to receive a probe connected to a microprocessor into connection to the contacts inside the housing for programming the motor.

In another form, the invention comprises a method of assembling an electric motor comprising the steps of:

forming a stator including a stator core and a winding thereon;

forming a rotor including a rotor shaft;

forming a housing adapted to support and at least partially enclose the stator and rotor;

connecting a printed circuit board having a programmable component thereon to the winding;

assembling the stator, rotor and housing such that the printed circuit board is enclosed in the housing;

inserting a probe through a port in the housing into connection with contacts on the printed circuit board subsequent to said step of assembling the stator, rotor and housing; and programming the programmable component through the probe connection to the printed circuit board.

Other objects and features of the present invention will be in part apparent and in part pointed out hereinafter.

BRIEF DESCRIPTION OF THE DRAWINGS

FIG. 5 is an enlarged, fragmentary view of the shroud of FIG. 1 as seen from the right side;

FIG. 6 is a side elevational view of a central locator member and rotor shaft bearing;

FIG. 7 is a right end elevational view thereof;

FIG. 8 is a longitudinal section of the locator member and bearing;

FIG. 9 is an end view of a stator core of the stator with the central locator member and pole pieces positioned by the locator member shown in phantom;

FIG. 10 is an opposite end view of the stator core;

FIG. 11 is a section taken in the plane including line 11—11 of FIG. 10;

FIG. 12 is a greatly enlarged, fragmentary view of the motor at the junction of a rotor hub with the stator;

FIG. 13 is a section taken in the plane including line 13—13 of FIG. 5, showing the printed circuit board in phantom and illustrating connection of a probe to a printed circuit board in the shroud and a stop;

FIG. 14 is a section taken in the plane including line 14—14 of FIG. 5 showing the printed circuit board in phantom and illustrating a power connector plug exploded from a plug receptacle of the shroud; and FIG. 15 is an enlarged, fragmentary view of the motor illustrating snap connection of the stator/rotor subassembly with the shroud.

Corresponding reference characters indicate corresponding parts throughout the several views of the drawings.

DETAILED DESCRIPTION OF THE PREFERRED EMBODIMENT

Figure 1:
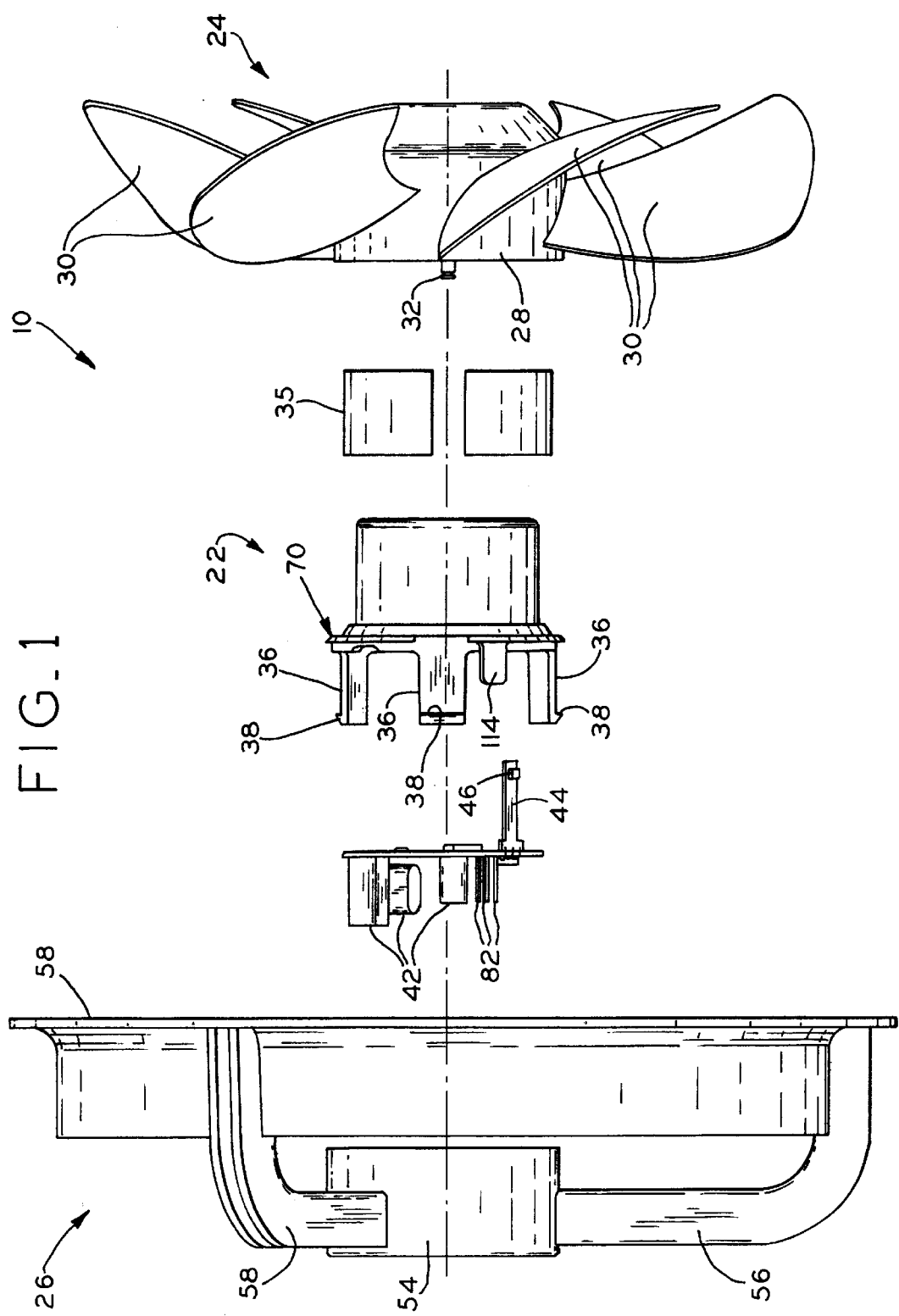
FIG. 1 is an exploded elevational view of an electric motor in the form of a fan.
Figure 3:
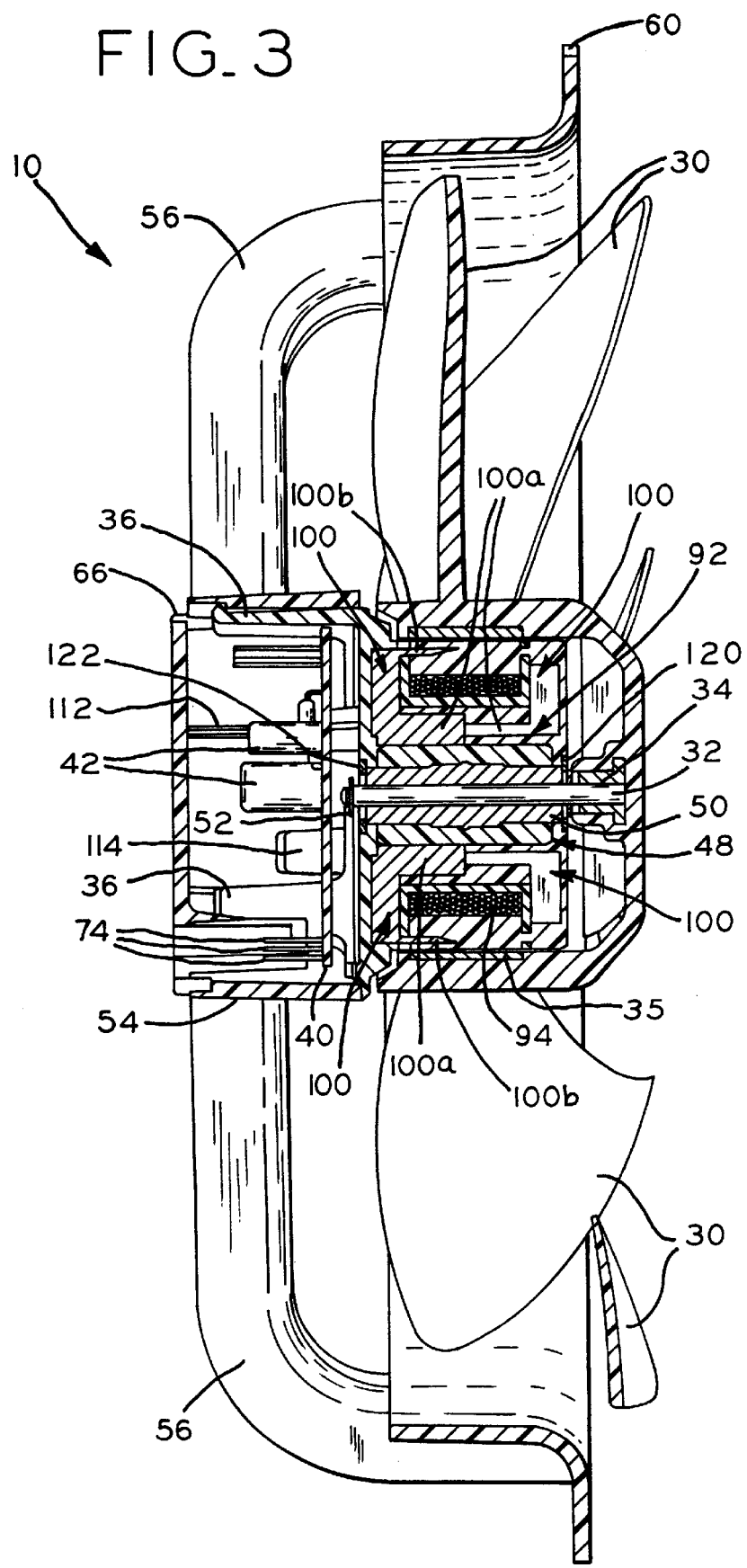
FIG. 3 is a vertical cross sectional view of the assembled motor.

Referring now to the drawings, and in particular to FIGS. 1 and 3, an electric motor 20 constructed according to the principles of the present invention includes a stator 22, a rotor 24 and a housing 26 (the reference numerals designating their subjects generally). In the illustrated embodiment, the motor 10 is of the type which the rotor magnet is on the outside of the stator, and is shown in the form of a fan. Accordingly, the rotor 24 includes a hub 28 having fan blades 30 formed integrally therewith and projecting radially from the hub. The hub 28 and fan blades 30 are formed as one piece of a polymeric material. The hub is open at one end and defines a cavity in which a rotor shaft 32 is mounted on the axis of the hub (FIG. 3). The shaft 32 is attached to the hub 28 by an insert 34 which is molded into the hub, along with the end of the shaft when the hub and fan blades 30 are formed. A rotor magnet 35 exploded from the rotor in FIG. 1 includes a magnetic material and iron backing. For simplicity, the rotor magnet 35 is shown as a unitary material in the drawings. The back iron is also molded into the hub cavity at the time the hub is formed.

The stator, 22 which will be described in further detail below, is substantially encapsulated in a thermoplastic material. The encapsulating material also forms legs 36 projecting axially of the stator 22. The legs 36 each have a catch 38 formed at the distal end of the leg. A printed circuit board generally indicated at 40, is received between the legs 36 in the assembled motor 10, and includes components 42, at least one of which is programmable, mounted on the board. A finger 44 projecting from the board 40 mounts a Hall device 46 which is received inside the encapsulation when the circuit board is disposed between the legs 36 of the stator 22. In the assembled motor 10, the Hall device 46 is in close proximity to the rotor magnet 35 for use in detecting rotor position to control the operation of the motor. The stator 22 also includes a central locator member generally indicated at 48, and a bearing 50 around which the locator member is molded. The bearing 50 receives the rotor shaft 32 through the stator 22 for mounting the rotor 24 on the stator to form a subassembly. The rotor 24 is held on the stator 22 by an E clip 52 attached to the free end of the rotor after it is inserted through the stator.

The housing 26 includes a cup 54 joined by three spokes 56 to an annular rim 58. The spokes 56 and annular rim 58 generally define a shroud around the fan blades 30 when the motor 10 is assembled. The cup 54, spokes 56 and annular rim 58 are formed as one piece from a polymeric material in the illustrated embodiment. The cup 54 is substantially closed on the left end (as shown in FIGS. 1 and 3), but open on the right end so that the cup can receive a portion of the stator/rotor subassembly. The annular rim 58 has openings 60 for receiving fasteners through the rim to mount the motor in a desired location, such as in a refrigerated case (not shown). The interior of the cup 54 is formed with guide channels 62 (FIG. 5) which receive respective legs 36. A shoulder 64 is formed in each guide channel 62 near the closed end of the cup 54 which engages the catch 38 on a leg to connect the leg to the cup (see FIGS. 3 and 16). The diameter of the cup 54 narrows from the open toward the closed end of the cup so that the legs 36 are resiliently deflected radially inwardly from their relaxed positions in the assembled motor 10 to hold the catches 38 on the shoulders 64. Small openings 66 in the closed end of the cup 54 (FIG. 5) permit a tool (not shown) to be inserted into the cup to pry the legs 36 off of the shoulders 64 for releasing the connection of the stator/rotor subassembly from the cup. Thus, it is possible to nondestructively disassemble the motor 10 for repair or reconfiguration (e.g., such as by replacing the printed circuit board 40). The motor may be reassembled by simply reinserting the legs 36 into the cup 54 until they snap into connection.

One application for which the motor 10 of the illustrated in the particular embodiment is particularly adapted, is as an evaporator fan in a refrigerated case. In this environment, the motor will be exposed to water. For instance, the case may be cleaned out by spraying water into the case. Water tends to be sprayed onto the motor 10 from above and to the right of the motor in the orientation shown in FIG. 3, and potentially may enter the motor wherever there is an opening or joint in the construction of the motor. The encapsulation of the stator 22 provides protection, but it is desirable to limit the amount of water which enters the motor. One possible site for entry of what is at the junction of the hub 28 of the rotor and the stator 22. An enlarged fragmentary view of this junction is shown in FIG. 12. The thermoplastic material encapsulating the stator is formed at this junction to create a tortuous path 68. Moreover, a skirt 70 is formed which extends radially outwardly from the stator. An outer edge 72 of the skirt 70 is beveled so that water directed from the right is deflected away from the junction.

The openings 66 which permit the connection of the stator/rotor subassembly to be released are potentially susceptible to entry of water into the cup where it may interfere with the operation of the circuit board. The printed circuit board 40, including the components 42, is encapsulated to protect it from moisture. However, it is still undesirable for substantial water to enter the cup. Accordingly, the openings 66 are configured to inhibit entry of water. Referring now to FIG. 15, a greatly enlarged view of one of the openings 66 shows a radially outer edge 66a and a radially inner edge 66b. These edges lie in a plane P1 which has an angle to a plane P2 generally parallel to the longitudinal axis of the rotor shaft of at least about 45°. It is believed that water is sprayed onto the motor at an angle of no greater than 45°. Thus, it may be seen that the water has no direct path to enter the opening 66 when it travels in a path making an angle of 45° or less will either strike the side of the cup 54, or pass over the opening, but will not enter the opening.

Figure 4:
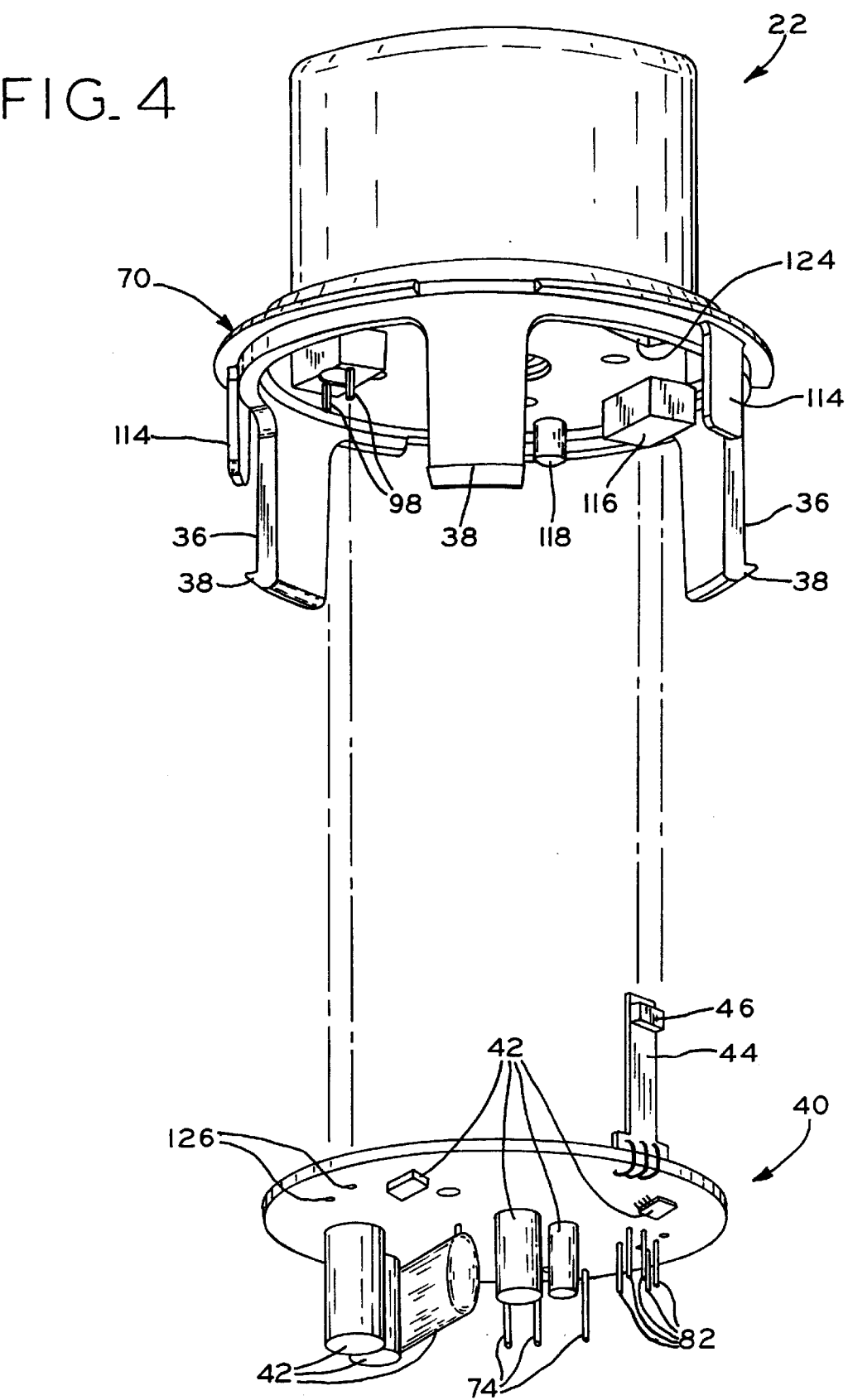
FIG. 4 is the stator and a printed circuit board exploded from its installed position on the stator.

The cup 54 of the housing 26 is also constructed to inhibit motor failures which can be caused by the formation of ice within the cup when the motor 10 is used in a refrigerated environment. More particularly, the printed circuit board 40 has power contacts 74 mounted on and projecting outwardly from the circuit board (FIG. 4). These contacts are aligned with an inner end of a plug receptacle 76 which is formed in the cup 54. Referring to FIG. 14, the receptacle 76 receives a plug 78 connected to an electrical power source remote from the motor. External controls (not shown) are also connected to the printed circuit board 40 through the plug 78. The receptacle 76 and the plug 78 have corresponding, rectangular cross sections so that when the plug is inserted, it substantially closes the plug receptacle.

When the plug 78 is fully inserted into the plug receptacle 76, the power contacts 74 on the printed circuit board 40 are received in the plug, but only partially. The plug receptacle 76 is formed with tabs 80 (near its inner end) which engage the plug 78 and limit the depth of insertion of the plug into the receptacle. As a result, the plug 78 is spaced from the printed circuit board 40 even when it is fully inserted in the plug receptacle 76. In the preferred embodiment, the spacing is about 0.2 inches. However, it is believed that a spacing of about 0.05 inches would work satisfactorily. Notwithstanding the partial reception of the power contacts 74 in the plug 78, electrical connection is made. The exposed portions of the power contacts 74, which are made of metal, tend to be subject to the formation of ice when the motor 10 is used in certain refrigeration environments. However, because the plug 78 and circuit board 40 are spaced, the formation of ice does not build pressure between the plug and the circuit board which would push the plug further away from the circuit board, causing electrical disconnection. Ice may and will still form on the exposed power contacts 74, but this will not cause disconnection, or damage to the printed circuit board 40 or the plug 78.

As shown in FIG. 13, the printed circuit board 40 also has a separate set of contacts 82 used for programming the motor 10. These contacts 82 are aligned with a tubular port 84 formed in the cup 54 which is normally closed by a stop 86 removably received in the port. When the stop 86 is removed the port can receive a probe 88 into connection with the contacts 82 on the circuit board 40. The probe 88 is connected to a microprocessor or the like (not shown) for programming or, importantly, re-programming the operation of the motor after it is fully assembled. For instance, the speed of the motor can be changed, or the delay prior to starting can be changed. Another example in the context of refrigeration is that the motor can be re-programmed to operate on different input, such as when demand defrost is employed. The presence of the port 84 and removable stop 86 allow the motor to be re-programmed long after final assembly of the motor and installation of the motor in a given application.

The port 84 is keyed so that the probe can be inserted in only one way into the port. As shown in FIG. 5, the key is manifested as a trough 90 on one side of the port 84. The probe has a corresponding ridge which is received in the trough when the probe is oriented in the proper way relative to the trough. In this way, it is not possible to incorrectly connect the probe 88 to the programming contacts. If the probe 88 is not properly oriented, it will not be received in the port 84.

Figure 2:
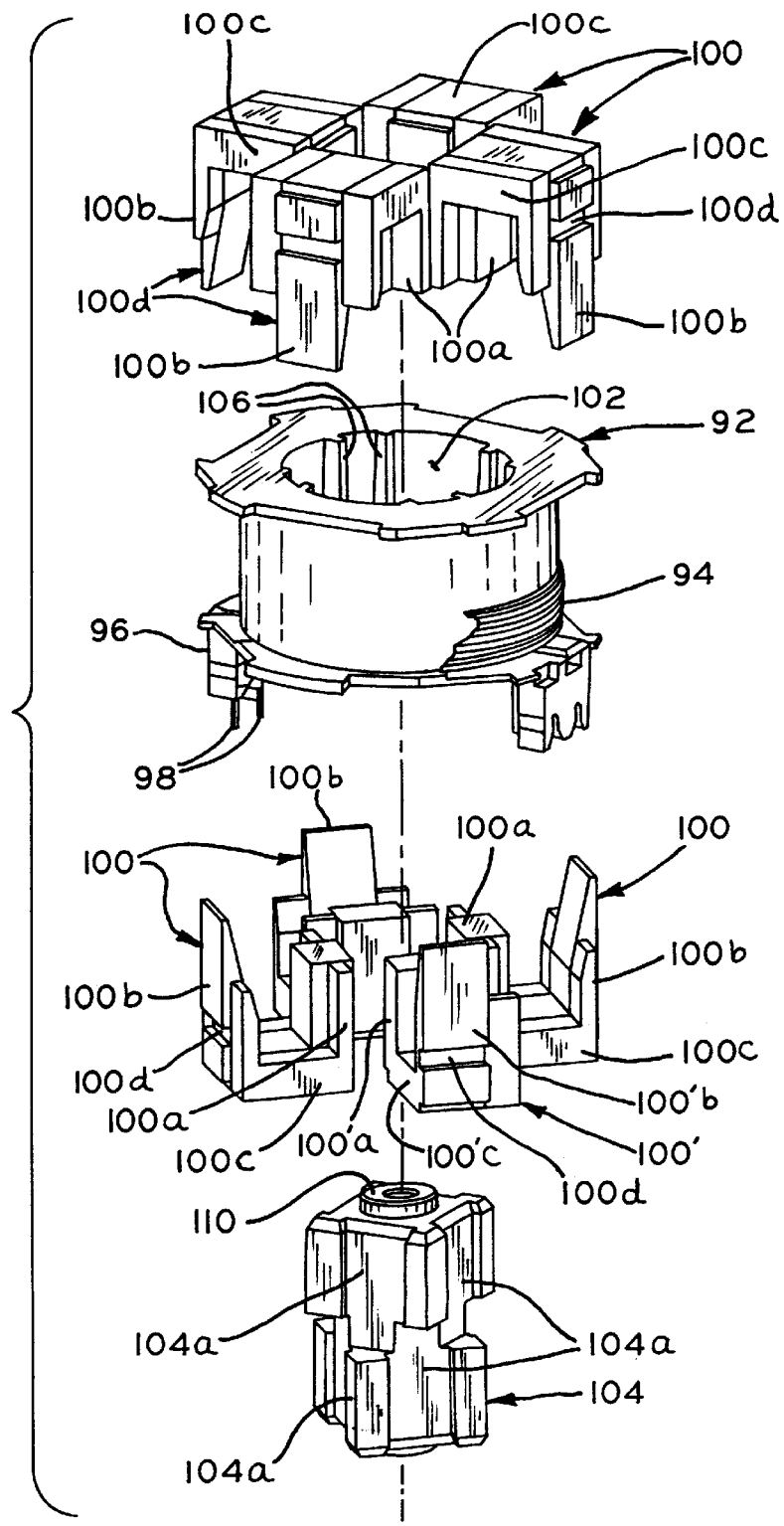
FIG. 2 is an exploded perspective view of component parts of a stator of the motor.

As shown in FIG. 2, the stator includes a stator core (or bobbin), generally indicated at 92, made of a polymeric material and a winding 94 wound around the core. The winding leads are terminated at a terminal pocket 96 formed as one piece with the stator core 92 by terminal pins 98 received in the terminal pocket. The terminal pins 98 are attached in a suitable manner, such as by soldering to the printed circuit board 40. However, it is to be understood that other ways of making the electrical connection can be used without departing from the scope of the present invention. It is envisioned that a plug-in type connection (not shown) could be used so that no soldering would be necessary.

The ferromagnetic material for conducting the magnetic flux in the stator 22 is provided by eight distinct pole pieces, generally indicated at 100. Each pole piece has a generally U-shape and including a radially inner leg 100a, a radially outer leg 100b and a connecting cross piece 100c. The pole pieces 100 are each preferably formed by stamping relatively thin U-shaped laminations from a web of steel and stacking the laminations together to form the pole piece 100. The laminations are secured together in a suitable manner, such as by welding or mechanical interlock. One form of lamination (having a long radially outer leg) forms the middle portion of the pole piece 100 and another form of lamination forms the side portions. It will be noted that one pole piece (designated 100' in FIG. 2) does not have one side portion. This is done intentionally to leave a space for insertion of the Hall device 46, as described hereinafter. The pole pieces 100 are mounted on respective ends of the stator core 22 so that the radially inner leg 100a of each pole piece is received in a central opening 102 of the stator core and the radially outer leg 100b extends axially along the outside of the stator core across a portion of the winding. The middle portion of the radially outwardly facing side of the radially outer leg 100b, which is nearest to the rotor magnet 35 in the assembled motor, is formed with a notch 100d. Magnetically, the notch 100d facilitates positive location of the rotor magnet 35 relative to the pole pieces 100 when the motor is stopped. The pole pieces could also be molded from magnetic material without departing from the scope of the present invention. In certain, low power applications, there could be a single pole piece stamped from metal (not shown), but having multiple (e.g., four) legs defining the pole piece bent down to extend axially across the winding.

The pole pieces 100 are held and positioned by the stator core 92 and a central locator member, generally indicated at 104. The radially inner legs 100a of the pole pieces are positioned between the central locator member 104 and the inner diameter of the stator core 92 in the central opening 102 of the stator core. Middle portions of the inner legs 100a are formed from the same laminations which make up the middle portions of the outer legs 100b, and are wider than the side portions of the inner legs. The radially inner edge of the middle portion of each pole piece inner leg 100a is received in a respective seat 104a formed in the locator member 104 to accept the middle portion of the pole piece. The seats 104a are arranged to position the pole pieces 100 asymmetrically about the locator member 104. No plane passing through the longitudinal axis of the locator member 104 and intersecting the seat 104a perpendicularly bisects the seat, or the pole piece 100 located by the seat. As a result, the gap between the radially outer legs 100b and the permanent magnet 35 of the rotor 24 is asymmetric to facilitate starting the motor.

The radially outer edge of the inner leg 100a engages ribs 106 on the inner diameter of the stator core central opening 102. The configuration of the ribs 106 is best seen in FIGS. 9–11. A pair of ribs (106a, 106b, etc.) is provided for each pole piece 100. The differing angulation of the ribs 106 apparent from FIGS. 9 and 10 reflects the angular offset of the pole pieces 100. The pole pieces and central locator member 104 have been shown in phantom in FIG. 9 to illustrate how each pair is associated with a particular pole piece on one end of the stator core. One of the ribs 106d' is particularly constructed for location of the unbalanced pole piece 100', and is engageable with the side of the inner leg 100a' rather than its radially outer edge. Another of the ribs 106d associated with the unbalanced pole piece has a lesser radial thickness because it engages the radially outer edge of the wider middle portion of the inner leg 100a'.

The central locator member 104 establishes the radial position of each pole piece 100. As discussed more fully below, some of the initial radial thickness of the ribs 106 may be sheared off by the inner leg 100a upon assembly to accommodate tolerances in the stator core 92, pole piece 100 and central locator member 104. The radially inner edge of each outer leg 100b is positioned in a notch 108 formed on the periphery of the stator core 92. Referring now to FIGS. 6–8, the central locator member 104 has opposite end sections which have substantially the same shape, but are angularly offset by 45° about the longitudinal axis of the central locator member (see particularly FIG. 7). The offset provides the corresponding offset for each of the four pole pieces 100 on each end of the stator core 92 to fit onto the stator core without interfering with one of the pole pieces on the opposite end. It is apparent that the angular offset is determined by the number of pole pieces 100 (i.e., 360° divided by the number of pole pieces), and would be different if a different number of pole pieces were employed. The shape of the central locator member 104 would be correspondingly changed to accommodate a different number of pole pieces 100. As shown in FIG. 8, the central locator member 104 is molded around a metal rotor shaft bearing 110 which is self lubricating for the life of the motor 10. The stator core 92, winding 94, pole pieces 100, central locator member 104 and bearing 110 are all encapsulated in a thermoplastic material to form the stator 22. The ends of the rotor shaft bearing 110 are not covered with the encapsulating material so that the rotor shaft 32 may be received through the bearing to mount the rotor 24 on the stator 22 (see FIG. 3).

Method of Assembly

Having described the construction of the electric motor 10, a preferred method of assembly will now be described. Initially, the component parts of the motor will be made. The precise order of construction of these parts is not critical, and it will be understood that some or all of the parts may be made a remote location, and shipped to the final assembly site. The rotor 24 is formed by placing the magnet 35 and the rotor shaft 32, having the insert 34 at one end, in a mold. The hub 28 and fan blades 30 are molded around the magnet 35 and rotor shaft 32 so that they are held securely on the hub. The housing 26 is also formed by molding the cup 54, spokes 56 and annular rim 58 as one piece. The cup 54 is formed internally with ribs 112 (FIG. 5) which are used for securing the printed circuit board 40, as will be described. The printed circuit board 40 is formed in a conventional manner by connection of the components 42 to the board. In the preferred embodiment, the programming contacts 82 and the power contacts 74 are shot into the circuit board 40, rather than being mounted by soldering (FIG. 4). The Hall device 46 is mounted on the finger 44 extending from the board and electrically connected to components 42 on the board.

The stator 22 includes several component parts which are formed prior to a stator assembly. The central locator member 104 is formed by molding around the bearing 110, which is made of bronze. The ends of the bearing 110 protrude from the locator member 104. The bearing 110 is then impregnated with lubricant sufficient to last the lifetime of the motor 10. The stator core 92 (or bobbin) is molded and wound with magnet wire and terminated to form the winding 94 on the stator core. The pole pieces 100 are formed by stamping multiple, thin, generally U-shaped laminations from a web of steel. The laminations are preferably made in two different forms, as described above. The laminations are stacked together and welded to form each U-shaped pole piece 100, the laminations having the longer outer leg and wider inner leg forming middle portions of the pole pieces. However, one pole piece 100' is formed without one side portion so that a space will be left for the Hall device 46.

The component parts of the stator 22 are assembled in a press fixture (not shown). The four pole pieces 100 which will be mounted on one end of the stator core 92 are first placed in the fixture in positions set by the fixture which are 90° apart about what will become the axis of rotation of the rotor shaft 32. The pole pieces 100 are positioned so that they open upwardly. The central locator member 104 and bearing 110 are placed in the fixture in a required orientation and extend through the central opening 102 of the stator core 92. The radially inner edges of the middle portions of the inner legs 100a of the pole pieces are received in respective seats 104a formed on one end of the central locator member 104. The wound stator core 92 is set into the fixture generally on top of the pole pieces previously placed in the fixture. The other four pole pieces 100 are placed in the fixture above the stator core 92, but in the same angular position they will assume relative to the stator core when assembly is complete. The pole pieces 100 above the stator core 92 open downwardly and are positioned at locations which are 45° offset from the positions of the pole pieces at the bottom of the fixture.

The press fixture is closed and activated to push the pole pieces 100 onto the stator core 92. The radially inner edges of the inner legs 100a of the pole pieces 100 engage their respective seats 104a of the central locator member. The seat 104a sets the radial position of the pole piece 100 it engages. The inner legs 100a of the pole pieces 100 enter the central opening 102 of the stator core 92 and engage the ribs 106 on the stator core projecting into the central opening. The variances in radial dimensions from design specifications in the central locator member 104, pole pieces 100 and stator core 92 caused by manufacturing tolerances are accommodated by the inner legs 100a shearing off some of the material of the ribs 106 engaged by the pole piece. The shearing action occurs as the pole pieces 100 are being passed onto the stator core 92. Thus, the tolerances of the stator core 92 are completely removed from the radial positioning of the pole pieces. The radial location of the pole pieces 100 must be closely controlled so as to keep the air gap between the pole pieces and the rotor magnet 35 as small as possible without mechanical interference of the stator 22 and rotor 24.

The assembled stator core 92, pole pieces 100, central locator member 104 and bearing 110 are placed in a mold and substantially encapsulated in a suitable fire resistant thermoplastic. In some applications, the mold material may not have to be fire resistant. The ends of the bearing 110 are covered in the molding process and remain free of the encapsulating material. The terminal pins 98 for making electrical connection with the winding 94 are also not completely covered by the encapsulating material (see FIG. 4). The skirt 70 and legs 36 are formed out of the same material which encapsulates the remainder of the stator. The legs 36 are preferably relatively long, constituting approximately one third of the length of the finished, encapsulated stator. Their length permits the legs 36 to be made thicker for a more robust construction, while permitting the necessary resilient bending needed for snap connection to the housing 26. In addition to the legs 36 and skirt 70, two positioning tangs 114 are formed which project axially in the same direction as the legs and require the stator 22 to be in a particular angular orientation relative to the housing 26 when the connection is made. Still further, printed circuit board supports are formed. Two of these take the form of blocks 116, from one of which project the terminal pins 98, and two others are posts 118 (only one of which is shown).

The encapsulated stator 22 is then assembled with the rotor 24 to form the stator/rotor subassembly. A thrust washer 120 (FIG. 3) is put on the rotor shaft 32 and slid down to the fixed end of the rotor shaft in the hub 28. The thrust washer 120 has a rubber-type material on one side capable of absorbing vibrations, and a low friction material on the other side to facilitate a sliding engagement with the stator 22. The low friction material side of the washer 120 faces axially outwardly toward the open end of the hub 28. The stator 22 is then dropped into the hub 28, with the rotor shaft 32 being received through the bearing 110 at the center of the stator. One end of the bearing 110 engages the low friction side of the thrust washer 120 so that the hub 28 can rotate freely with respect to the bearing. Another thrust washer 122 is placed on the free end of the bearing 110 and the E clip 52 is shaped onto the end of the rotor shaft 32 so that the shaft cannot pass back through the bearing. Thus, the rotor 24 is securely mounted on the stator 22.

The printed circuit board 40 is secured to the stator/rotor subassembly. The assembly of the printed circuit board 40 is illustrated in FIG. 4, except that the rotor 24 has been removed for clarity of illustration. The printed circuit board 40 is pushed between the three legs 36 of the stator 22. The finger 44 of the circuit board 40 is received in an opening 124 formed in the encapsulation so that the Hall device 46 on the end of the finger is positioned within the encapsulation next to the unbalanced pole piece 100', which was made without one side portion so that space would be provided for the Hall device. The side of the circuit board 40 nearest the stator 22 engages the blocks 116 and posts 118 which hold the circuit board at a predetermined spaced position from the stator. The terminal pins 98 projecting from the stator 22 are received through two openings 126 in the circuit board 40. The terminal pins 98 are electrically connected to the components 42 circuit board in a suitable manner, such as by soldering. The connection of the terminal pins 98 to the board 40 is the only fixed connection of the printed circuit board to the stator 22.

The stator/rotor subassembly and the printed circuit board 40 are then connected to the housing 26 to complete the assembly of the motor. The legs 36 are aligned with respective channels 62 in the cup 54 and the tangs 114 are aligned with recesses 128 formed in the cup (see FIGS. 5 and 14). The legs 36 will be received in the cup 54 in only one orientation because of the presence of the tangs 114. The stator/rotor subassembly is pushed into the cup 54. The free ends of the legs 36 are beveled on their outer ends to facilitate entry of the legs into the cup 54. The cup tapers slightly toward its closed end and the legs 36 are deflected radially inwardly from their relaxed configurations when they enter the cup and as they are pushed further into it. When the catch 38 at the end of each leg clears the shoulder 64 at the inner end of the channel 62, the leg 36 snaps radially outwardly so that the catch engages the shoulder. The leg 36 is still deflected from its relaxed position so that it is biased radially outwardly to hold the catch 38 on the shoulder 64. The engagement of the catch 38 with the shoulder 64 prevents the stator/rotor subassembly, and printed circuit board 40 from being withdrawn from the cup 54. The motor 10 is now fully assembled, without the use of any fasteners, by snap together construction.

The printed circuit board 40 is secured in place by an interference fit with the ribs 112 in the cup 54. As the stator/rotor assembly advances into the cup 54, peripheral edges of the circuit board 40 engage the ribs 112. The ribs are harder than the printed circuit board material so that the printed circuit board is partially deformed by the ribs 112 to create the interference fit. In this way the printed circuit board 40 is secured in place without the use of any fasteners. The angular orientation of the printed circuit board 40 is set by its connection to the terminal pins 98 from the stator 22. The programming contacts 82 are thus aligned with the port 84 and the power contacts 74 are aligned with the plug receptacle 76 in the cup 54. It is also envisioned that the printed circuit board 40 may be secured to the stator 22 without any interference fit with the cup 54. For instance, a post (not shown) formed on the stator 22 may extend through the circuit board and receive a push nut thereon against the circuit board to fix the circuit board on the stator.

In the preferred embodiment, the motor 10 has not been programmed or tested prior to the final assembly of the motor. Following assembly, a ganged connector (not shown, but essentially a probe 88 and a power plug 78) is connected to the printed circuit board 44 through the port and plug receptacle 76. The motor is then programmed, such as by setting the speed and the start delay, and tested. If the circuit board 40 is found to be defective, it is possible to non-destructively disassemble the motor and replace the circuit board without discarding other parts of the motor. This can be done by inserting a tool (not shown) into the openings 66 in the closed end of the cup 54 and prying the catches 38 off the shoulders 64. If the motor passes the quality assurance tests, the stop 86 is placed in the port 84 and the motor is prepared for shipping.

It is possible with the motor of the present invention, to re-program the motor 10 after it has been shipped from the motor assembly site. The end user, such as a refrigerated case manufacturer, can remove the stop 86 from the port 84 and connect the probe 88 to the programming contacts 82 through the port. The motor can be re-programmed as needed to accommodate changes made by the end user in operating specifications for the motor.

The motor 10 can be installed, such as in a refrigerated case, by inserting fasteners (not shown) through the openings 60 in the annular rim 58 and into the case. Thus, the housing 26 is capable of supporting the entire motor through connection of the annular rim 58 to a support structure. The motor is connected to a power source by plugging the plug 78 into the plug receptacle 76 (FIG. 14). Detents 130 (only one is shown) on the sides of the plug 78 are received in slots on respective sides of a tongue 132 to lock the plug in the plug receptacle 76. Prior to engaging the printed circuit board 40, the plug 78 engages the locating tabs 80 in the plug receptacle 76 so that in its fully inserted position, the plug is spaced from the printed circuit board. As a result, the power contacts 74 are inserted far enough into the plug 78 to make electrical connection, but are not fully received in the plug. Therefore, although ice can form on the power contacts 74 in the refrigerated case environment, it will not build up between the plug 78 and the circuit board 40 causing disconnection and/or damage.

Figure 16:
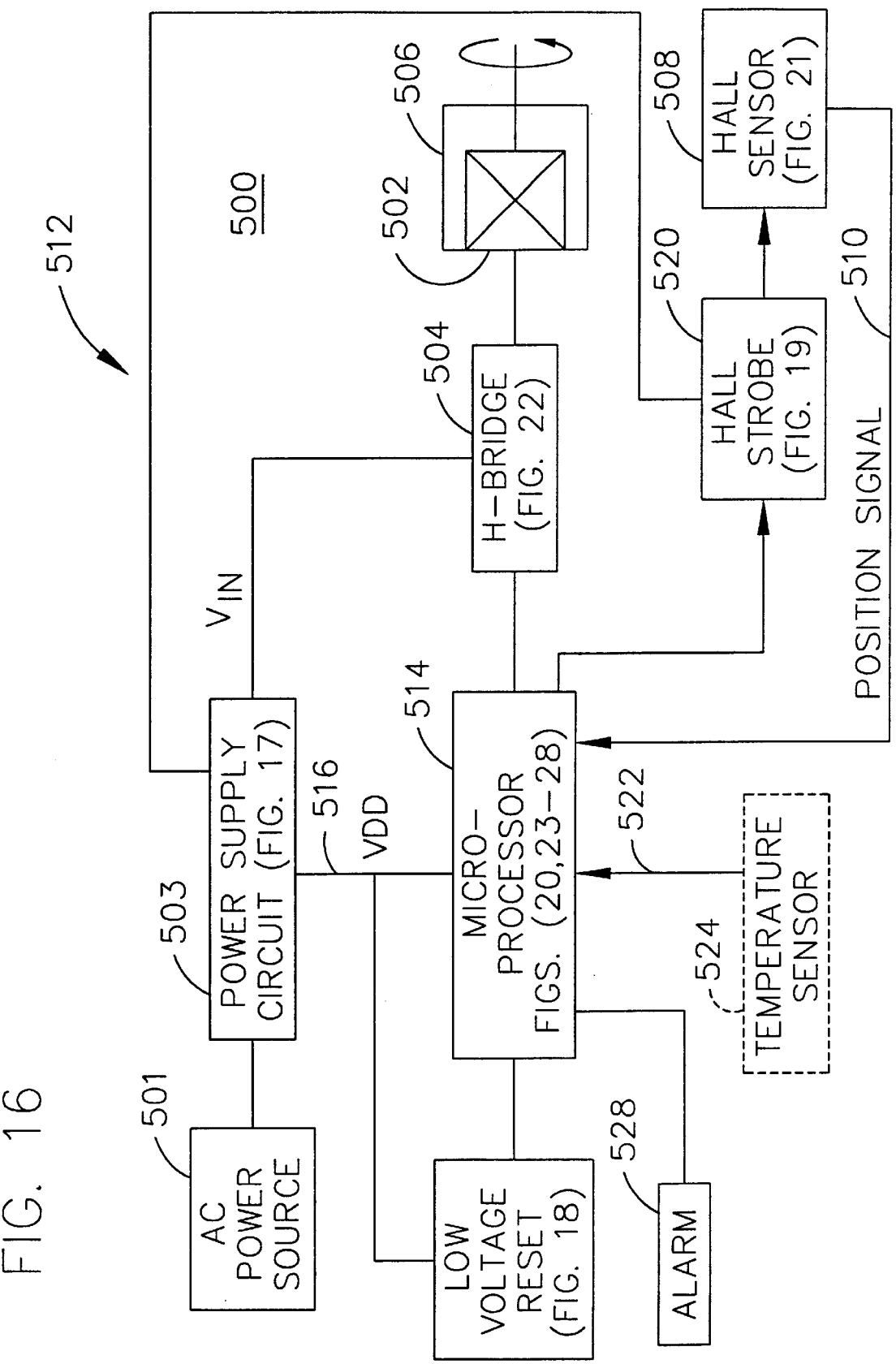
FIG. 16 is a block diagram of the microprocessor controlled single phase motor according to the invention.

FIG. 16 is a block diagram of the microprocessor controlled single phase motor 500 according to the invention. The motor 500 is powered by an AC power source 501. The motor 500 includes a stator 502 having a single phase winding. The direct current power from the source 501 is supplied to a power switching circuit via a power supply circuit 503. The power switching circuit may be any circuit for commutating the stator 502 such as an H-bridge 504 having power switches for selectively connecting the dc power source 501 to the single phase winding of the stator 502. A permanent magnet rotor 506 is in magnetic coupling relation to the stator and is rotated by the commutation of the winding and the magnetic field created thereby. Preferably, the motor is an inside-out motor in which the stator is interior to the rotor and the exterior rotor rotates about the interior stator. However, it is also contemplated that the rotor may be located within and internal to an external stator.

A position sensor such as a hall sensor 508 is positioned on the stator 502 for detecting the position of the rotor 506 relative to the winding and for providing a position signal via line 510 indicating the detected position of the rotor 506. Reference character 512 generally refers to a control circuit including a microprocessor 514 responsive to and receiving the position signal via line 510. The microprocessor 514 is connected to the H-bridge 504 for selectively commutating the power switches thereof to commutate the single phase winding of the stator 502 as a function of the position signal.

Voltage VDD to the microprocessor 514 is provided via line 516 from the power supply circuit 503. A low voltage reset circuit 518 monitors the voltage VDD on line 516 and applied to the microprocessor 514. The reset circuit 518 selectively resets the microprocessor 514 when the voltage VDD applied to the microprocessor via line 516 transitions from below a predetermined threshold to above the predetermined threshold. The threshold is generally the minimum voltage required by the microprocessor 514 to operate. Therefore, the purpose of the reset circuit 518 is to maintain operation and re-establish operation of the microprocessor in the event that the voltage VDD supplied via line 516 drops below the preset minimum required by the microprocessor 514 to operate.

Optionally, to save power, the hall sensor 508 may be intermittently powered by a hall strobe 520 controlled by the microprocessor 514 to pulse width modulate the power applied to the hall sensor.

The microprocessor 514 has a control input 522 for receiving a signal which affects the control of the motor 500. For example, the signal may be a speed select signal in the event that the microprocessor is programmed to operate the rotor such that the stator is commutated at two or more discrete speeds. Alternatively, the motor may be controlled at continuously varying speeds or torques according to temperature. For example, in place of or in addition to the hall sensor 508, an optional temperature sensor 524 may be provided to sense the temperature of the ambient air about the motor. This embodiment is particularly useful when the rotor 506 drives a fan which moves air through a condenser for removing condenser generated heat or which moves air through an evaporator for cooling, such as illustrated in FIGS. 1–15.

In one embodiment, the processor interval clock corresponds to a temperature of the air moving about the motor and for providing a temperature signal indicating the detected temperature. For condenser applications where the fan is blowing air into the condenser, the temperature represents the ambient temperature and the speed (air flow) is adjusted to provide the minimum needed air flow at the measured temperature to optimize the heat transfer process. When the fan is pulling air over the condenser, the temperature represents ambient temperature plus the change in temperature (Δt) added by the heat removed from the condenser by the air stream. In this case, the motor speed is increased in response to the higher combined temperature (speed is increased by increasing motor torque, i.e., reducing the power device off time PDOFFTIM; see FIG. 26). Additionally, the speed the motor could be set for different temperature bands to give different air flow which would be distinct constant air flows in a given fan static pressure condition. Likewise, in a condenser application, the torque required to run the motor at the desired speed represents the static load on the motor. The higher static loads can be caused by installation in a restricted environment, i.e., a refrigerator installed as a built-in, or because the condenser air flow becomes restricted due to dust build up or debris. Both of these conditions may warrant an increased air flow/speed.

Similarly, in evaporator applications, the increased static pressure could indicate evaporator icing or increased packing density for the items being cooled.

In one of the commercial refrigeration applications, the evaporator fan pulls the air from the air curtain and from the exit air cooling the food. This exhaust of the fan is blown through the evaporator. The inlet air temperature represents air curtains and food exit air temperature. The fan speed would be adjusted appropriately to maintain the desired temperature.

Alternatively, the microprocessor 514 may commutate the switches at a variable speed rate to maintain a substantially constant air flow rate of the air being moved by the fan connected to the rotor 506. In this case, the microprocessor 514 provides an alarm signal by activating alarm 528 when the motor speed is greater than a desired speed corresponding to the constant air flow rate at which the motor is operating. As with the desired torque, the desired speed may be determined by the microprocessor as a function of an initial static load of the motor and changes in static load over time.

Figure 23:
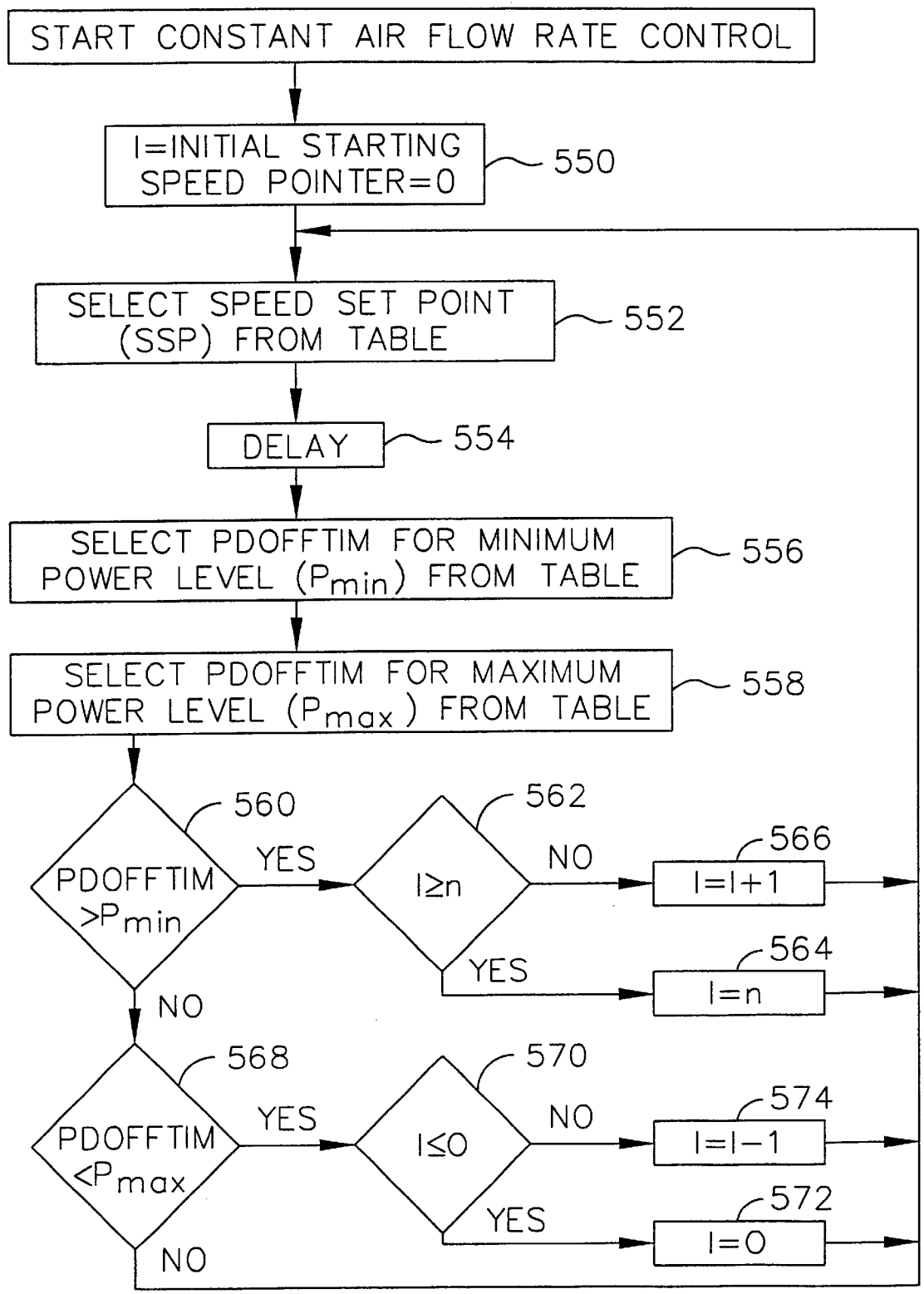
FIG. 23 is a flow diagram illustrating the operation of the microprocessor of the motor of the invention in a mode in which the motor is commutated at a constant air flow rate at a speed and torque which are defined by tables which exclude resonant points.

FIG. 23 illustrates one preferred embodiment of the invention in which the microprocessor 514 is programmed according to the flow diagram therein. In particular, the flow diagram of FIG. 23 illustrates a mode in which the motor is commutated at a constant air flow rate corresponding to a speed and torque which are defined by tables which exclude resonant points. For example, when the rotor is driving a fan for moving air over a condenser, the motor will have certain speeds at which a resonance will occur causing increased vibration and/or increased audio noise. Speeds at which such vibration and/or noise occur are usually the same or similar and are predictable, particularly when the motor and its associated fan are manufactured to fairly close tolerances. Therefore, the vibration and noise can be minimized by programming the microprocessor to avoid operating at certain speeds or within certain ranges of speeds in which the vibration or noise occurs. As illustrated in FIG. 23, the microprocessor 514 would operate in the following manner. After starting, the microprocessor sets the target variable I to correspond to an initial starting speed pointer defining a constant air flow rate at step 550. For example, I=0. Next, the microprocessor proceeds to step 552 and selects a speed set point (SSP) from a table which correlates each of the variable levels 0 to n to a corresponding speed set point (SSP), to a corresponding power device off time (PDOFFTIM=$P_{min}$) for minimum power and to a corresponding power device off time (PDOFFTIM=$P_{max}$) for maximum power.

It is noted that as the PDOFFTIM increases, the motor power decreases since the controlled power switches are off for longer periods during each commutation interval. Therefore, the flow chart of FIG. 23 is specific to this approach. Others skilled in the art will recognize other equivalent techniques for controlling motor power.

After a delay at step 554 to allow the motor to stabilize, the microprocessor 514 selects a PDOFFTIM for a minimum power level ($P_{min}$) from the table which provides current control by correlating a minimum power level to the selected level of variable I. At step 558 the microprocessor selects a PDOFFTIM for a maximum power level ($P_{max}$) from the table which provides current control by correlating a maximum power level to the selected variable level I.

At step 560, the microprocessor compares the actual PDOFFTIM representing the actual power level to the minimum PDOFFTIM ($P_{min}$) for this I. If the actual PDOFFTIM is greater than the minimum PDOFFTIM (PDOFFTIM>$P_{min}$), the microprocessor proceeds to step 562 and compares the variable level I to a maximum value n. If I is greater or equal to n, the microprocessor proceeds to step 564 to set I equal to n. Otherwise, I must be less than the maximum value for I so the microprocessor 514 proceeds to step 566 to increase I by one step.

If, at step 560, the microprocessor 514 determines that the actual PDOFFTIM is less than or equal to the minimum PDOFFTIM (PDOFFTIM≦$P_{min}$), the microprocessor proceeds to step 568 and compares the actual PDOFFTIM representing the actual power level to the maximum PDOFFTIM ($P_{max}$) for this I. If the actual PDOFFTIM is less than the maximum PDOFFTIM (PDOFFTIM<$P_{max}$), the microprocessor proceeds to step 570 and compares the variable level I to a minimum value 0. If I is less or equal to 0, the microprocessor proceeds to step 572 to set I equal to 0. Otherwise, I must be greater than the minimum value for I so the microprocessor 514 proceeds to step 574 to decrease I by one step.

If the actual PDOFFTIM is less than or equal to the minimum and is greater than or equal to the maximum so that the answer to both steps 560 and 568 is no, the motor is operating at the speed and power needed to provide the desired air flow so the microprocessor returns to step 552 to maintain its operation.

Alternatively, the microprocessor 514 may be programmed with an algorithm which defines the variable rate at which the switches are commutated. This variable rate may vary continuously between a preset range of at least a minimum speed $S_{min}$ and not more than a maximum speed $S_{max}$ except that a predefined range of speeds S1+/−S2 is excluded from the preset range. As a result, for speeds between S1−S2 and S1, the microprocessor operates the motor at S1−S2 and for speeds between S1 and S1+S2, the microprocessor operates the motor at speeds S1+S2.

Figure 22:
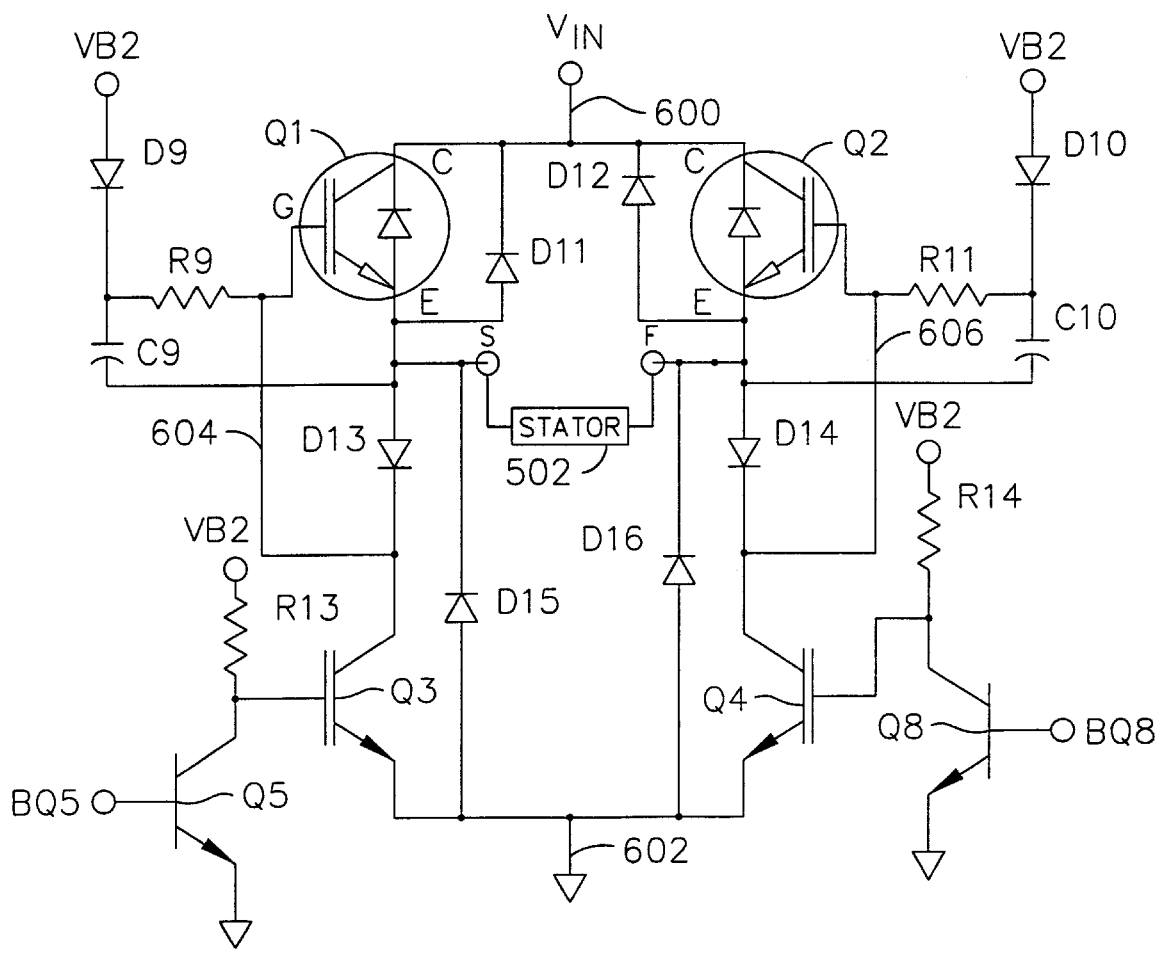
FIG. 22 is a schematic diagram of the H-bridge array of witches for commutating the stator of the motor of FIG. 16 according to the invention.

FIG. 22 is a schematic diagram of the H-bridge 504 which constitutes the power switching circuit having power switches according to the invention, although other configurations may be used, such as two windings which are single ended or the H-bridge configuration of U.S. Pat. No. 5,859,519, incorporated by reference herein. The dc input voltage is provided via a rail 600 to input switches Q1 and Q2. An output switch Q3 completes one circuit by selectively connecting switch Q2 and stator 502 to a ground rail 602. An output switch Q4 completes another circuit by selectively connecting switch Q1 and stator 502 to the ground rail 602. Output switch Q3 is controlled by a switch Q5 which receives a control signal via port BQ5. Output switch Q4 is controlled by a switch Q8 which receives a control signal via port BQ8. When switch Q3 is closed, line 604 pulls the gate of Q1 down to open switch Q1 so that switch Q1 is always open when switch Q3 is closed. Similarly, line 606 insures that switch Q2 is open when switch Q4 is closed.

Figure 27:
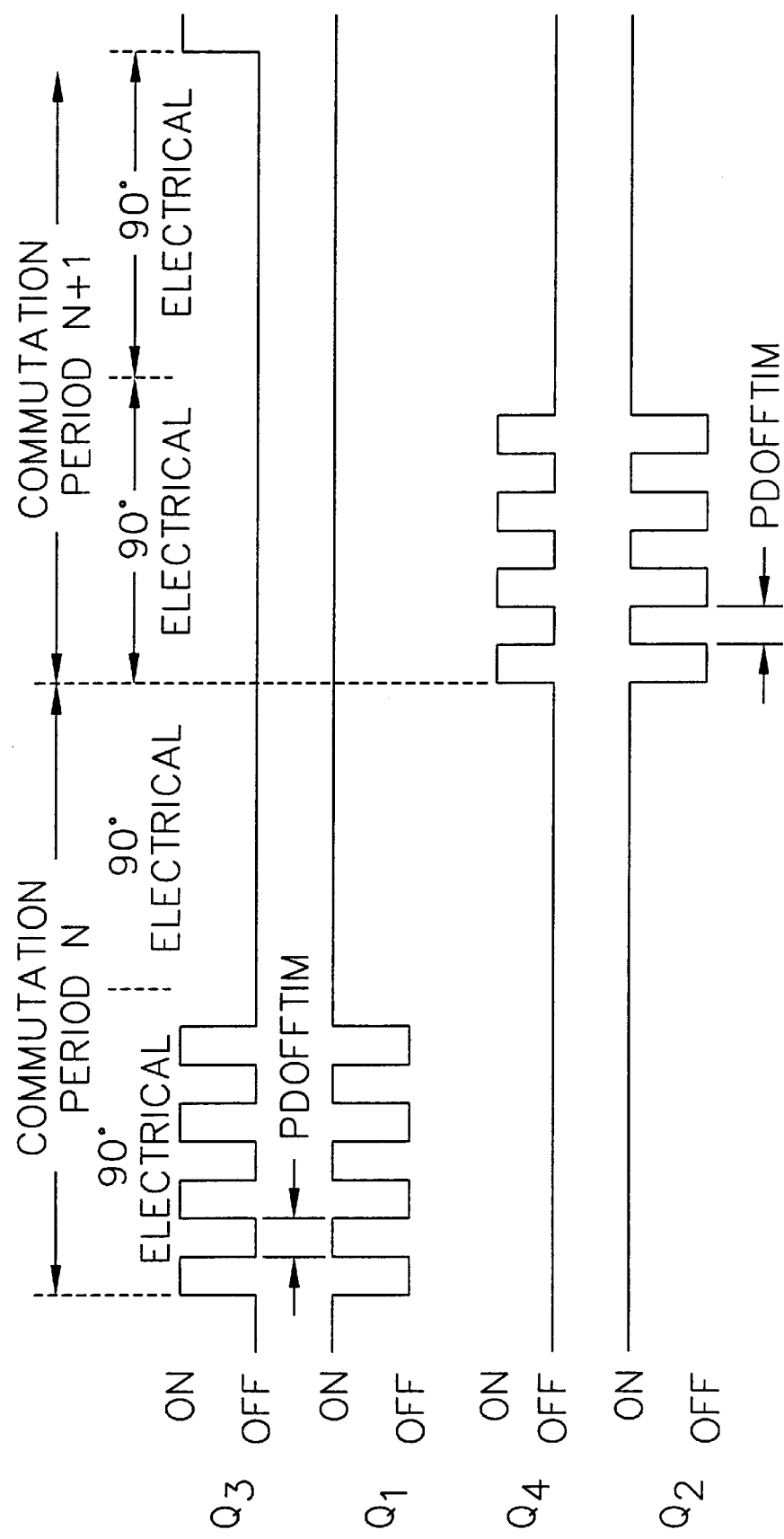
FIG. 27 is a timing diagram illustrating the run up mode which provides a safe operating area (SOA) control based on speed.

The single phase winding of the stator 502 has a first terminal F and a second terminal S. As a result, switch Q1 constitutes a first input switch connected between terminal S and the power supply provided via rail 600. Switch Q3 constitutes a first output switch connected between terminal S and the ground rail 602. Switch Q2 constitutes a second input switch connected between the terminal F and the power supply provided via rail 600. Switch Q4 constitutes a second output switch connected between terminal F and ground rail 602. As a result, the microprocessor controls the first input switch Q1 and the second input switch Q2 and the first output switch Q3 and the second output switch Q4 such that the current through the motion is provided during the first 90° of the commutation period illustrated in FIG. 27. The first 90° is significant because of noise and efficiency reasons and applies to this power device topology (i.e., either Q1 or Q2 is always "on" when either Q3 or Q4 is off, respectively. PDOFFTIM is the term used in the software power control algorithms. When the first output switch Q3 is open, the first input switch Q1 is closed. Similarly, the second input switch Q2 is connected to and responsive to the second output switch Q4 so that when the second output switch Q4 is closed, the second input switch Q2 is open. Also, when the second output switch Q4 is open, the second input switch Q2 is closed. This is illustrated in FIG. 27 wherein it is shown that the status of Q1 is opposite the status of Q3 and the status of Q2 is opposite the status of Q4 at any instant in time.

Figure 26:
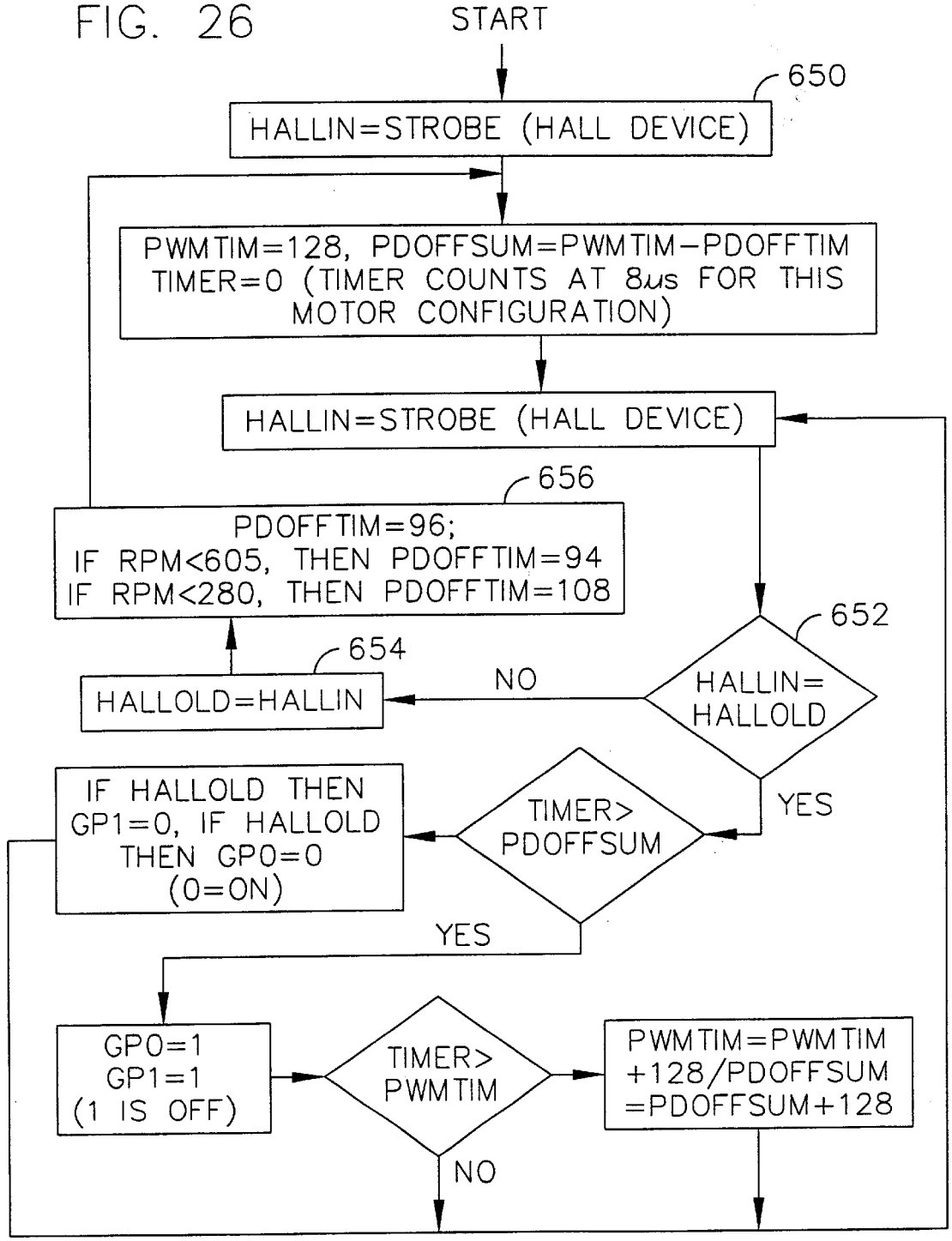
FIG. 26 is a flow chart of one preferred embodiment of implementation of the timing diagram of FIG. 25 illustrating the start up mode which provides a safe operating area (SOA) control based on speed.

FIG. 26 is a timing flow chart illustrating the start up mode with a current maximum determined by the setting of PDOFFTIM versus the motor speed. In this mode, the power devices are pulse width modulated by software in a continuous mode to get the motor started. The present start algorithm stays in the start mode eight commutations and then goes into the RUN mode. A similar algorithm could approximate constant acceleration by selecting the correct settings for PDOFFTIM versus speed. At step 650, the value HALLIN is a constant defining the starting value of the Hall device reading. When the actual Hall device reading (HALLOLD) changes at step 652, HALLIN is set to equal HALLOLD at step 654 and the PDOFFTIM is changed at step 656 depending on the RPMs.

Figure 25:
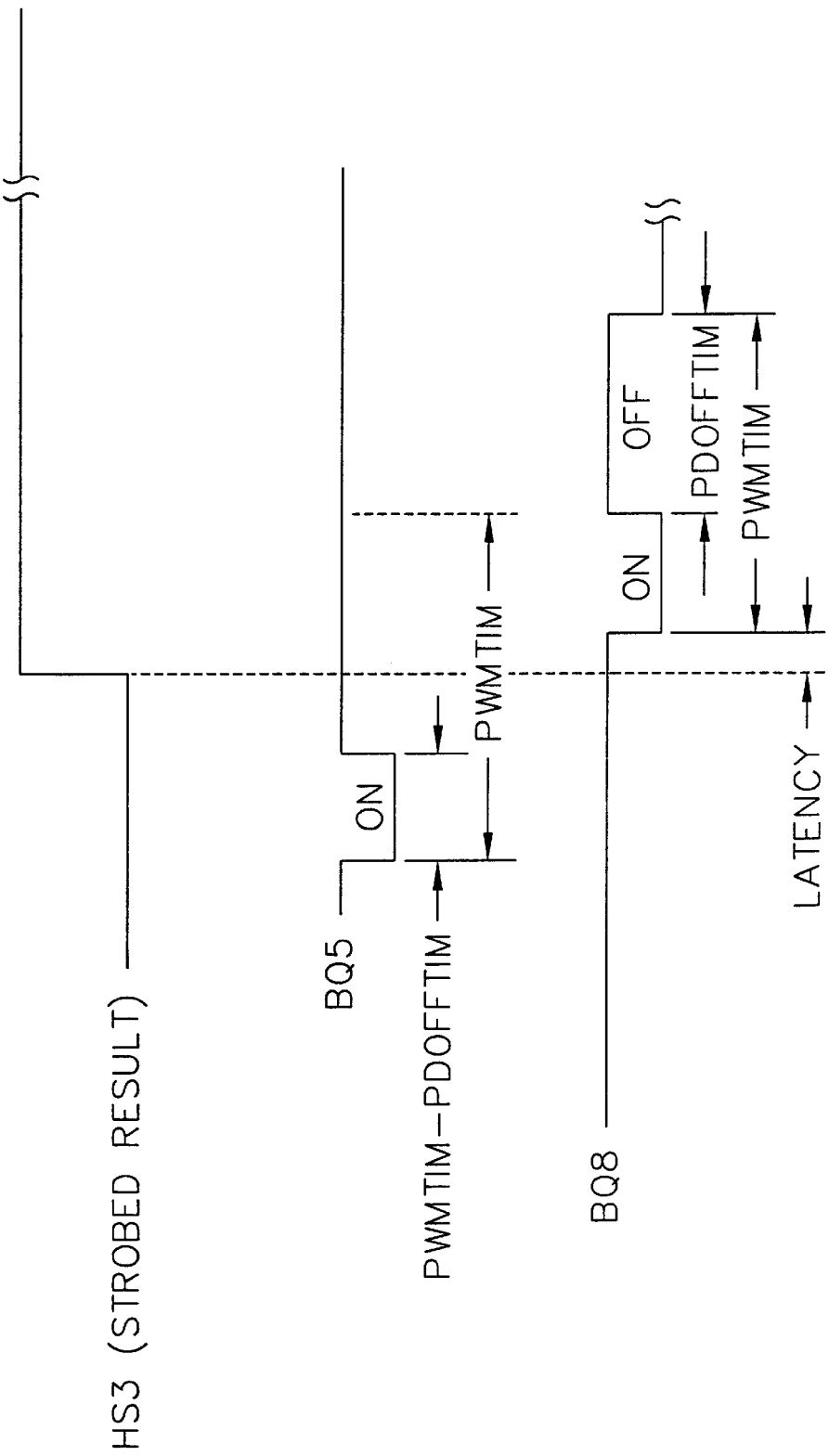
FIG. 25 is a timing diagram illustrating the start up mode which provides a safe operating area (SOA) control based on speed.

FIG. 25 illustrates the microprocessor outputs (BQ5 and BQ8) that control the motor when the strobed hall effect output (HS3) changes state. In this example, BQ5 is being pulse width modulated while HS3 is 0. When HS3 (strobed) changes to a 1, there is a finite period of time (LATENCY) for the microprocessor to recognize the magnetic change after which BQ5 is in the off state so that BQ8 begins to pulse width modulate (during PWMTIM).

Figure 24:
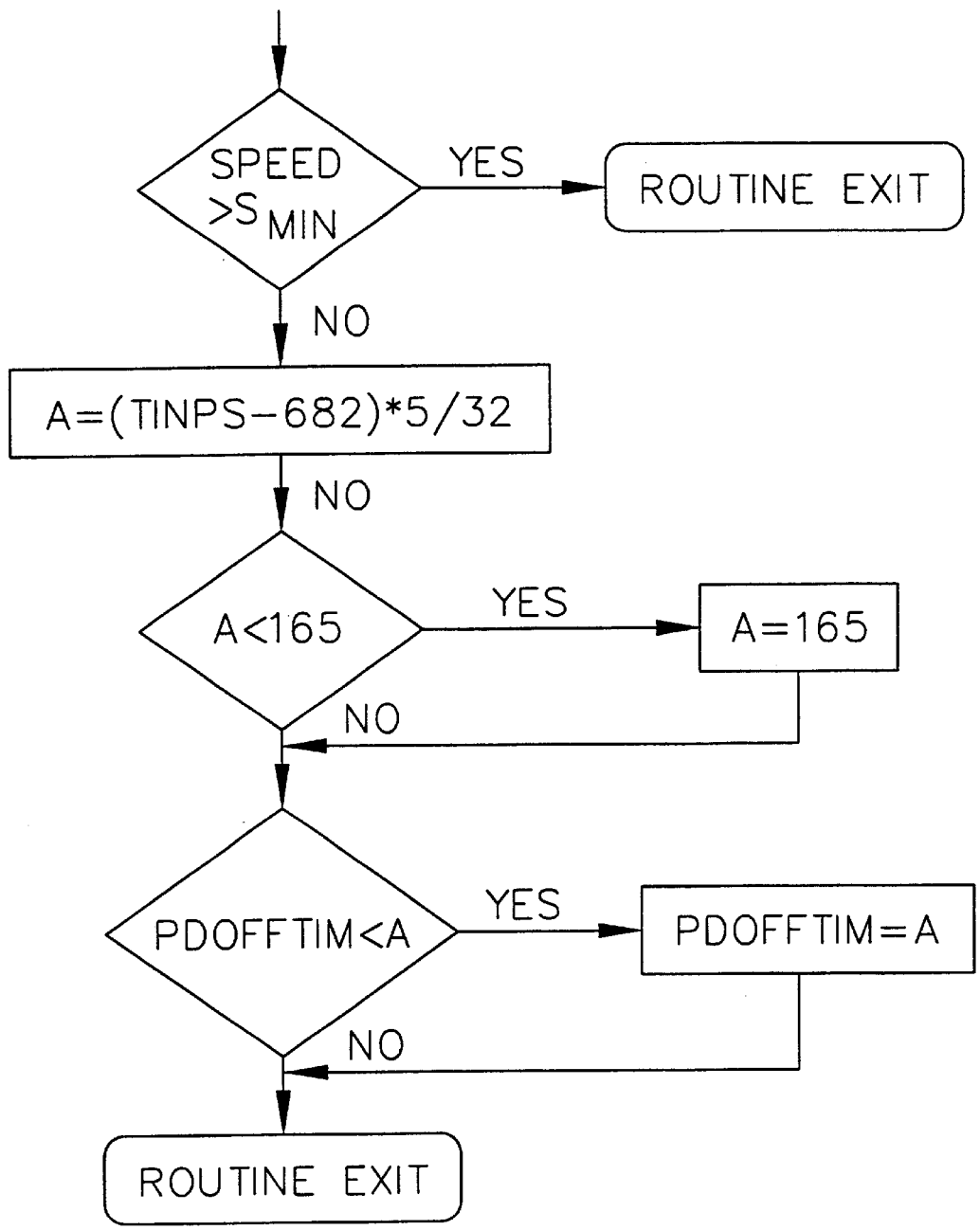
FIG. 24 is a flow diagram illustrating operation of the microprocessor of the motor of the invention in a run mode (after start) in which the safe operating area of the motor is maintained without current sensing by having a minimum off time for each power switch, the minimum off time depending on the speed of the rotor.

FIG. 24 illustrates another alternative aspect of the invention wherein the microprocessor operates within a run mode safe operating area without the need for current sensing. In particular, according to FIG. 24, microprocessor 514 controls the input switches Q1–Q4 such that each input switch is open or off for a minimum period of time (PDOFFTIM) during each pulse width modulation period whereby over temperature protection is provided without current sensing. Specifically, the minimum period may be a function of the speed of the rotor whereby over temperature protection is provided-without current sensing by limiting the total current over time. As illustrated in FIG. 24, if the speed is greater than a minimum value (i.e., if A<165), A is set to 165 and SOA limiting is bypassed and not required; if the speed is less than (or equal to) a minimum value (i.e., if A≧165), the routine of FIG. 24 ensures that the switches are off for a minimum period of time to limit current. "A" is a variable and is calculated by an equation that represents a PDOFFTIM minimum value at a given speed (speed is a constant multiplied by 1/TINPS, where TINPS is the motor period). Then, if PDOFFTIM is<A, PDOFFTIM is set to A so that the motor current is kept to a maximum desired value at the speed the motor is running.

Figure 18:
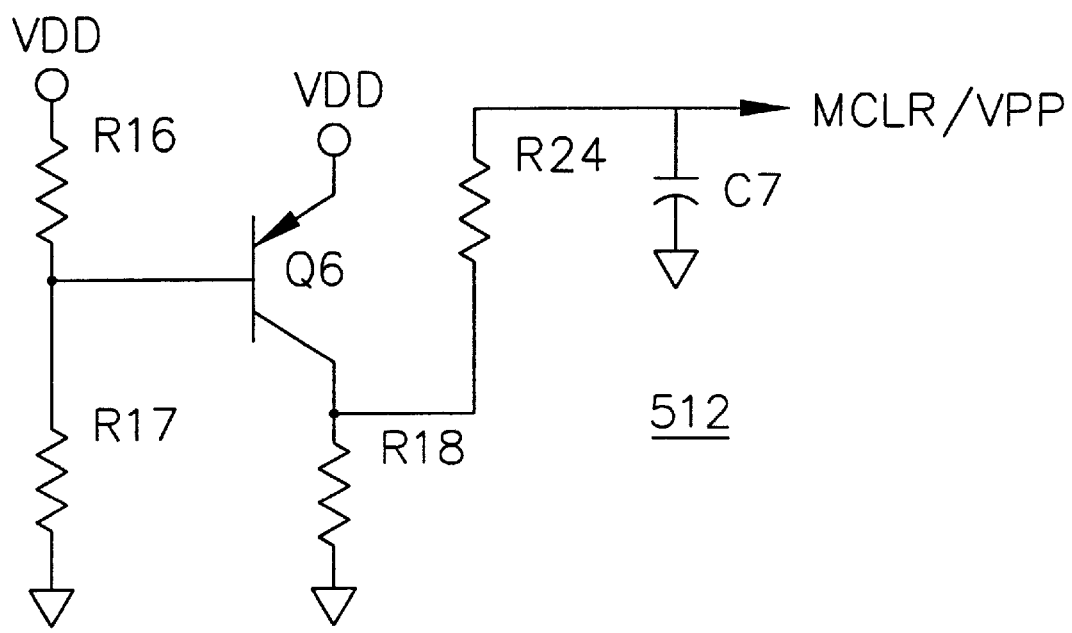
FIG. 18 is a schematic diagram of the low voltage reset for the microprocessor of the motor of FIG. 16 according to the invention.

As illustrated in FIG. 18, the motor includes a reset circuit 512 for selectively resetting the microprocessor when a voltage of the power supply vdd transitions from below a predetermined threshold to above a predetermined threshold. In particular, switch Q6 disables the microprocessor via port MCLR/VPP when the divided voltage between resistors R16 and R17 falls below a predetermined threshold. The microprocessor is reactivated and reset when the voltage returns to be above the predetermined threshold thereby causing switch Q6 to close.

Figure 19:
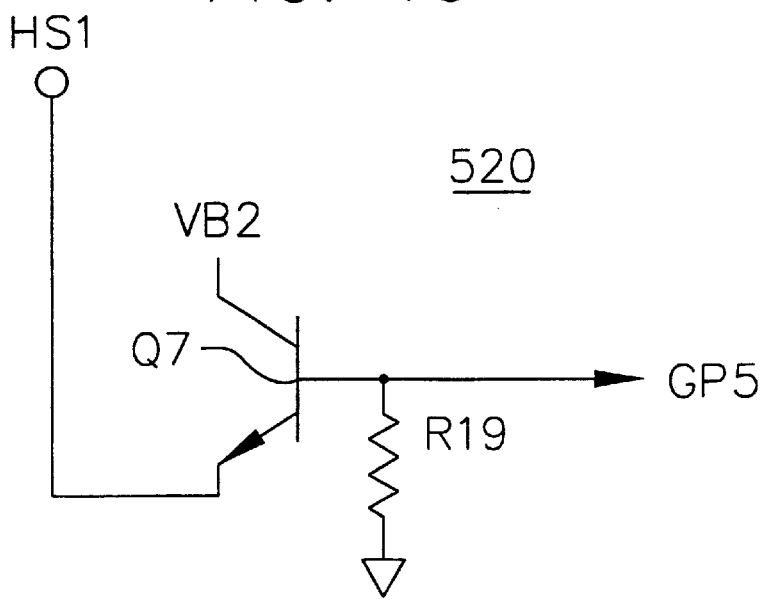
FIG. 19 is a schematic diagram of the strobe for the Hall sensor of the motor of FIG. 16 according to the invention.
Figure 21:
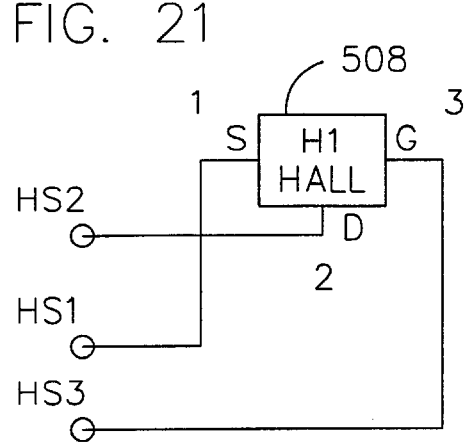
FIG. 21 is a schematic diagram of the Hall sensor of the motor of FIG. 16 according to the invention.

FIG. 19 illustrates one preferred embodiment of a strobe circuit 520 for the hall sensor 508. The microprocessor generates a pulse width modulated signal GP5 which intermittently powers the hall sensor 508 as shown in FIG. 21 by intermittently closing switch Q7 and providing voltage VB2 to the hall sensor 508 via line HS1.

Figure 17:
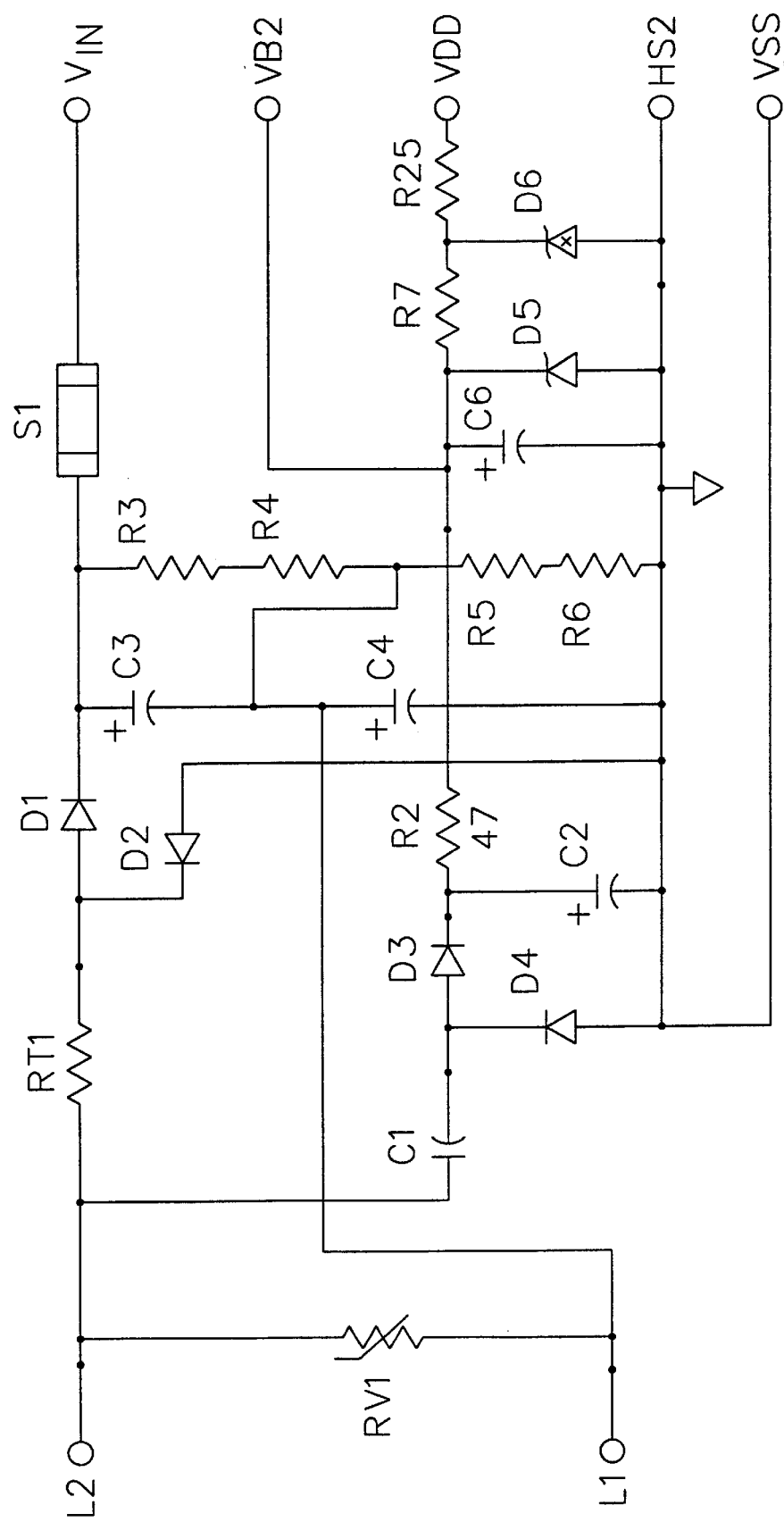
FIG. 17 is a schematic diagram of the power supply of the motor of FIG. 16 according to the invention. Alternatively, the power supply circuit could be modified for a DC input or for a non-doubling AC input.

FIG. 17 is a schematic diagram of the power supply circuit 503 which supplies the voltage $V_{in}$ for energizing the stator single phase winding via the H-bridge 504 and which also supplies various other voltages for controlling the H-bridge 504 and for driving the microprocessor 514. In particular, the lower driving voltages including VB2 for providing control voltages to the switches Q1–Q4, VDD for driving the microprocessor, HS2 for driving the hall sensor 508, and VSS which is the control circuit reference ground not necessarily referenced to the input AC or DC voltage are supplied from the input voltage $V_{in}$ via a lossless inline series capacitor C1.

Figure 20:
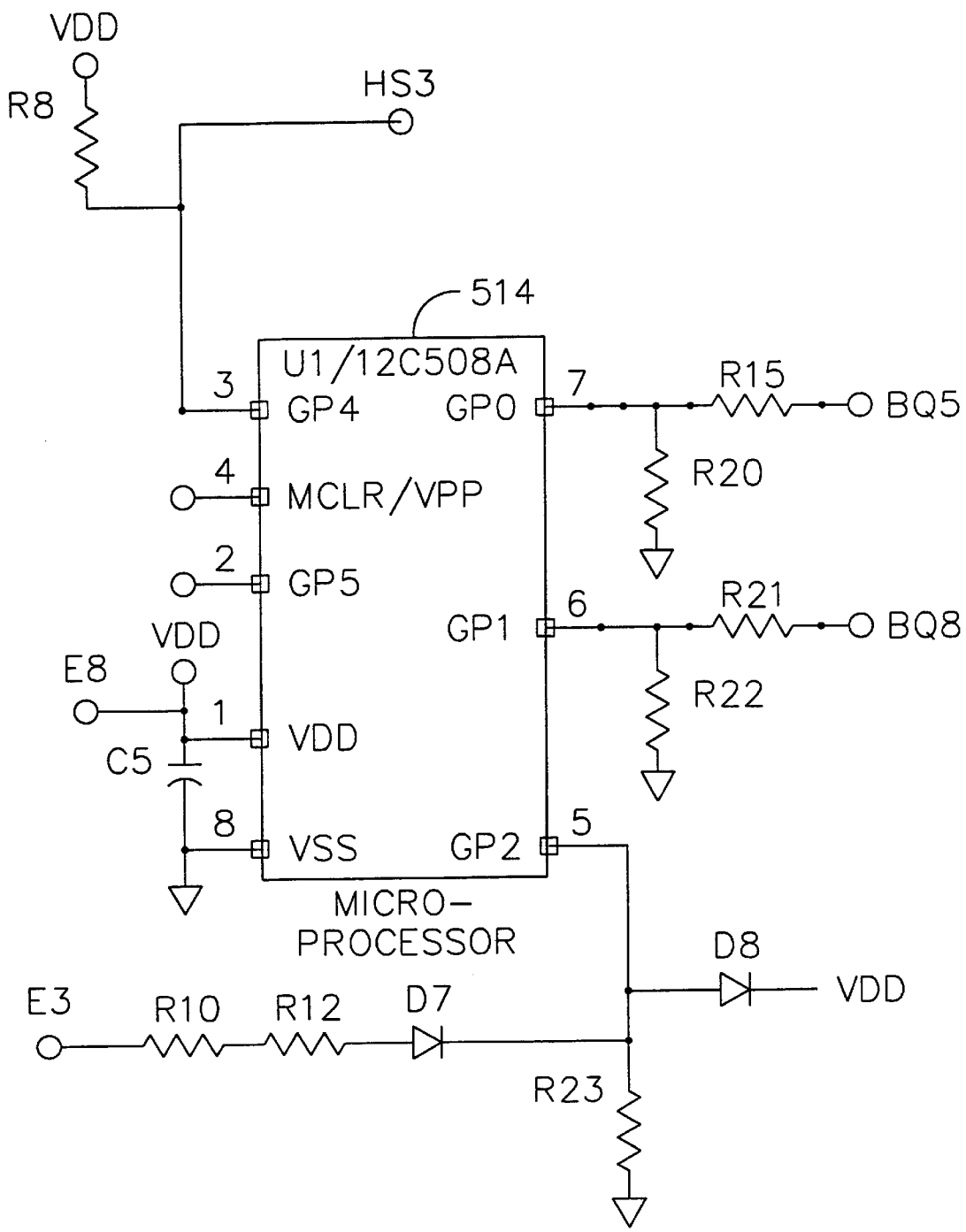
FIG. 20 is a schematic diagram of the microprocessor of the motor of FIG. 16 according to the invention.

FIG. 20 illustrates the inputs and outputs of microprocessor 514. In particular, only a single input GP4 from the position sensor is used to provide information which controls the status of control signal BQ5 applied to switch Q5 to control output switch Q3 and input switch Q1 and which controls the status of control signal EQS applied to switch Q8 to control output switch Q4 and input switch Q2. Input GP2 is an optional input for selecting motor speed or other feature or may be connected for receiving a temperature input comparator output when used in combination with thermistor 524.

Figure 28:
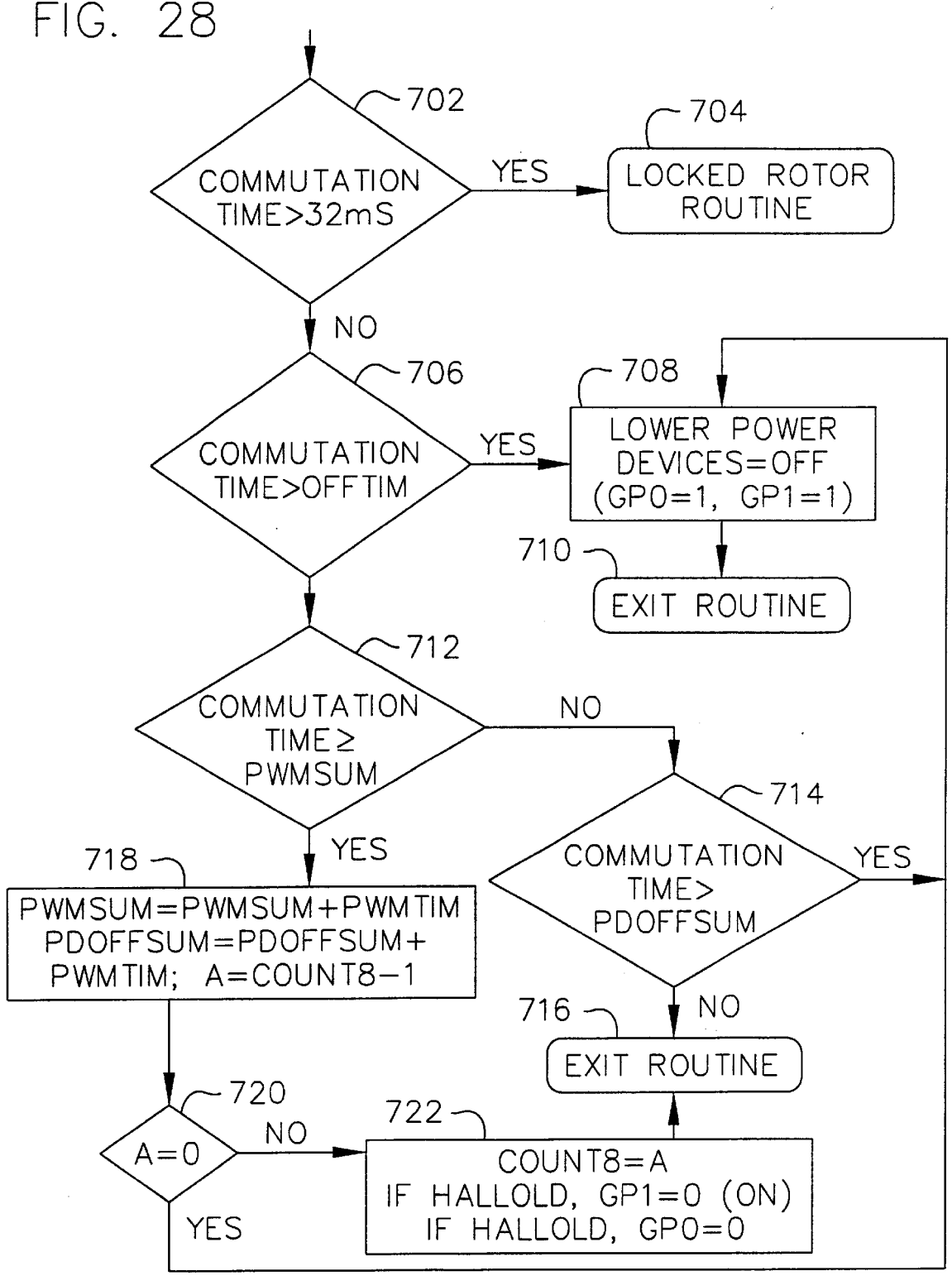
FIG 28 is a flow diagram illustrating the operation of the microprocessor of the motor of the invention in a run mode started after a preset number of commutations in the start up mode wherein in the run mode the microprocessor commutates the switches for N commutations at a constant commutation period and wherein the commutation period is adjusted every M commutations as a function of the speed, the torque or the constant air flow rate of the rotor.

FIG. 28 illustrates a flow chart of one preferred embodiment of a run mode in which the power devices are current controlled. In this mode, the following operating parameters apply:

MOTOR RUN POWER DEVICE (CURRENT) CONTROL

At the end of each commutation, the time power devices will be off the next time the commutation period is calculated. OFFTIM=TINP/2. (The commutation period divided by 2=90°). While in the start routine, this is also calculated. After eight commutations (1 motor revolution) and at the start routine exit, PWMTIM is calculated:
PWMTIM=OFFTIM/4
At the beginning of each commutation period, a counter (COUNT8) is set to five to allow for four times the power devices will be turned on during this commutation:
PWMSUM=PWMTIM
PDOFFSUM=PWMTIM−PDOFFTIM
TIMER=0
(PDOFFTIM is used to control the amount of current in the motor and is adjusted in the control algorithm (SPEED, TORQUE, CFM, etc.).

Commutation time set to 0 at each strobed hall change, HALLOLD is the saved hall strobe value.

During motor run, the flow chart of FIG. 28 is executed during each commutation period. In particular at step 702, the commutation time is first checked to see if the motor has been in this motor position for too long a period of time, in this case 32 mS. If it has, a locked rotor is indicated and the program goes to the locked rotor routine at step 704. Otherwise, the program checks to see if the commutation time is greater then OFFTIM at step 706; if it is, the commutation period is greater than 90 electrical degrees and the program branches to step 708 which turns the lower power devices off and exits the routine at step 710. Next, the commutation time is compared at step 712 to PWMSUM. If it is less than PWMSUM, the commutation time is checked at step 714 to see if it is less or equal to PDOFFSUM where if true, the routine is exited at step 716; otherwise the routine branches to step 708 (if step 714 is yes).

For the other case where the commutation time is greater or equal to PWMSUM, at step 718 PWMSUM and PDOFFSUM have PWMTIM added to them to prepare for the next pulse width modulation period and a variable A is set to COUNT 8-1.

If A is equal to zero at step 720, the pulse width modulations (4 pulses) for this commutation period are complete and the program branches to step 708 to turn the lower power devices off and exit this routine. If A is not equal to zero, COUNT8 (which is a variable defining the number of PWMs per commutation) is set to A at step 722; the appropriate lower power device is turned on; and this routine is exited at step 716. More PWM counts per commutation period can be implemented with a faster processor. Four (4) PWMs per commutation period are preferred for slower processors whereas eight (8) are preferred for faster processors.

The timing diagram for this is illustrated in FIG. 27. In the locked rotor routine of step 704, on entry, the lower power devices are turned off for 1.8 seconds after which a normal start attempt is tried.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An electric motor comprising:

a stator including a stator core, a winding on the stator core;

a rotor including a shaft received in the stator core for rotation of the rotor relative to the stator about the longitudinal axis of the shaft;

a housing connected together with the stator and rotor to form an assembled motor, the housing being adapted to support the stator and rotor;

a printed circuit board having programmable components thereon for controlling operation of the motor, the printed circuit board having contacts mounted thereon and electrically connected to the programmable components for use in programming the programmable components, the printed circuit board being received in the housing;

the housing having a port therein generally in registration with the contacts on the printed circuit board, the port being sized and shaped to receive a probe connected to a microprocessor into connection to the contacts inside the housing for programming the motor.

2. An electric motor as set forth in claim 1 further comprising a plug removably received in the port to close the port.

3. An electric motor as set forth in claim 2 wherein the port is shaped to receive the probe in only one orientation of the probe for connection of the probe to the contacts.

4. An electric motor as set forth in claim 1 wherein the printed circuit board has an electrical connection to the winding and is free of other connection to the stator, the printed circuit board having an interference fit with the housing and being free of other connection to the housing.

5. An electric motor as set forth in claim 4 wherein the housing has internal ribs formed therein and engaging peripheral edges of the printed circuit board to form said interference fit with the circuit board.

6. An electric motor as set forth in claim 1 wherein the stator includes plural legs projecting from the stator, each leg being resiliently deflected and having a catch formed at the end thereof, and wherein the housing includes plural shoulders, the catch of each leg being engaged with a respective one of the shoulders in the housing for snap latch connection of the stator and rotor mounted on the stator to the housing.

7. An electric motor as set forth in claim 6 wherein the housing comprises a cup receiving a portion of the stator therein, the cup including openings therein disposed for accessing the free ends of the legs in the housing for non-destructively releasing the catches from the shoulders in the cup for disassembly of the motor.

8. An electric motor as set forth in claim 7 wherein each opening in the housing includes a radially outer edge and a radially inner edge lying in a plane making an angle of at least about 45° with the longitudinal axis of the rotor shaft thereby to inhibit entry of water into the housing through the opening.

9. An electric motor as set forth in claim 6 wherein the stator core and winding are substantially encapsulated in a thermoplastic material, the legs of the stator being formed as one piece from the thermoplastic material encapsulating the stator core and windings.

10. An electric motor as set forth in claim 1 wherein the stator further comprises plural distinct pole pieces and a separate central locator member, the central locator member being received in a central opening of the stator core and engaging radially inner edges of the pole pieces to radially position the pole pieces.

11. An electric motor as set forth in claim 10 wherein the stator core includes axially extending ribs projecting radially inwardly into the central opening of the stator core and engaging the pole pieces, the pole pieces shearing material from at least one of the ribs upon assembly of the pole pieces and central locator member with the stator core so that said one rib has a reduced thickness.

12. An electric motor as set forth in claim 10 further comprising a rotor shaft bearing generally disposed in the central opening of the stator core and receiving the rotor shaft therein, the central locator member being molded around the bearing.

13. An electric motor as set forth in claim 1 wherein the stator comprises plural distinct pole pieces mounted on the stator core, each pole piece having a generally U-shape and including an inner leg received in a central opening of the stator core and an outer leg extending axially of the stator core at a location outside of the central opening of the stator core, a radially outwardly directed face of the outer leg having a radially outwardly opening notch therein.

14. An apparatus comprising:
   a stator including a stator core and a winding thereon;
   a rotor including a rotor shaft;
   a housing adapted to support and at least partially enclose the stator and rotor;
   a printed circuit board having a programmable component thereon connected to the winding and contacts mounted on the circuit board and electrically connected to the programmable component;
   wherein the stator, rotor and housing are assembled such that the printed circuit board is enclosed in the housing;
   a probe adapted to be inserted through a port in the housing into connection with contacts on the printed circuit board; and
   wherein the programmable component is adapted to be programmed through a probe connection to the printed circuit board.

15. The apparatus of claim 14 wherein the probe is adapted to perform electrical tests on the motor through the connection of the probe with the printed circuit board.

16. The apparatus of 15 further comprising a stop inserted into the port to close the port.

* * * * *